May 27, 1952 H. W. BALZER 2,598,098

TELEPHONE CALL DISTRIBUTING SYSTEM

Filed Aug. 24, 1946 9 Sheets-Sheet 1

INVENTOR.
HARVEY W. BALZER

BY

Chas. W. Candy

ATTORNEY

May 27, 1952 H. W. BALZER 2,598,098

TELEPHONE CALL DISTRIBUTING SYSTEM

Filed Aug. 24, 1946 9 Sheets-Sheet 2

INVENTOR.
HARVEY W. BALZER

BY Chas. W. Candy

ATTORNEY

May 27, 1952 H. W. BALZER 2,598,098

TELEPHONE CALL DISTRIBUTING SYSTEM

Filed Aug. 24, 1946 9 Sheets-Sheet 3

INVENTOR.
HARVEY W. BALZER

BY Chas. W. Candy

ATTORNEY

May 27, 1952

H. W. BALZER 2,598,098

TELEPHONE CALL DISTRIBUTING SYSTEM

Filed Aug. 24, 1946

9 Sheets-Sheet 4

INVENTOR.
HARVEY W. BALZER

BY

Chas. W. Candy

ATTORNEY

May 27, 1952 H. W. BALZER 2,598,098

TELEPHONE CALL DISTRIBUTING SYSTEM

Filed Aug. 24, 1946 9 Sheets-Sheet 5

*INVENTOR.*
HARVEY W. BALZER

*BY* Chas. W. Candy

ATTORNEY

May 27, 1952 H. W. BALZER 2,598,098

TELEPHONE CALL DISTRIBUTING SYSTEM

Filed Aug. 24, 1946 9 Sheets-Sheet 6

STORAGE CONTROL CIR. 600

INVENTOR.
HARVEY W. BALZER

BY Chas. W. Cardy

ATTORNEY

May 27, 1952 H. W. BALZER 2,598,098

TELEPHONE CALL DISTRIBUTING SYSTEM

Filed Aug. 24, 1946 9 Sheets-Sheet 7

INVENTOR.
HARVEY W. BALZER

BY Chas. H. Canfield

ATTORNEY

May 27, 1952 H. W. BALZER 2,598,098

TELEPHONE CALL DISTRIBUTING SYSTEM

Filed Aug. 24, 1946 9 Sheets-Sheet 8

INVENTOR.
HARVEY W. BALZER

BY Chas. W. Candy

ATTORNEY

INVENTOR.
HARVEY W. BALZER
BY
Chas. L. Cowdy
ATTORNEY

Patented May 27, 1952

2,598,098

UNITED STATES PATENT OFFICE 2,598,098

TELEPHONE CALL DISTRIBUTING SYSTEM

Harvey W. Balzer, Downers Grove, Ill., assignor to Automatic Electric Laboratories, Inc., Chicago, Ill., a corporation of Delaware Application August 24, 1946, Serial No. 692,884

31 Claims. (Cl. 179—27)

The present invention relates to telephone systems in general and, more particularly, to improved arrangements for distributing calls to the operator positions of a switchboard in which the calls are routed to individual operator positions by finder switches.

Specifically stated the present embodiment of the invention lies in an improved arrangement for distributing calls to the operator positions of an automatic toll switchboard of the type disclosed in the Imre Molnar Patent No. 2,361,313, issued October 24, 1944. The lines and trunks, over which calls may be directed to the operator positions of a switchboard of the type referred to, have their conductors multipled to terminals in the banks of finder switches which are associated with individual operators positions. When a call is originated by a line or trunk, the test terminals of the calling circuit are marked in the finder banks and a finder switch associated with an idle operator position hunts for the marked test terminals which, when found, cause the finder switch to connect the calling circuit to the idle operator position. The finder banks are so arranged that relatively little movement of the finder is required to connect to the terminals of some of the lines while a relatively large movement of the finder is required to connect to the terminals of other lines. At times when the traffic on the switchboard becomes heavy and a number of incoming calls are waiting to be answered, a circuit with terminals in relatively unfavorable positions in the finder banks may wait considerably longer than the average answering time for calls in this period. Numerous methods have been used to improve this condition among them the practice of "slipping" the multiple so that the terminals of every circuit have a relatively favorable position in some of the finders. Another method makes waiting calls accessible to the operator positions in groups so that calls originating after a group of calls becomes accessible to the operator positions cannot be answered until all of the calls of the group have been answered. Both of the above methods tend to prevent the maximum answering time from becoming excessive in comparison to the average answering time.

It is the aim of the present invention to distribute calls to the operator positions of a switchboard in relatively the same order that the calls are received at the switchboard so that the maximum answering time will be the shortest possible and will be governed mainly by the availability of an operator to answer the call. The arrangement is effective so long as the number of calls waiting to be answered does not exceed the number of storage switches.

To accomplish this purpose there is provided a marking control circuit for each circuit on which incoming calls may be received, a group of storage switches, a storage control circuit common to the group of storage switches, and a storage distributor having relays individual to each of the storage switches. It may be noted that the call storage feature is effective only for incoming calls and that when the marking control circuit is associated with a two way line or trunk it has no function to perform on outgoing calls.

The start lead of each circuit, normally connected to the common start circuit of the finder switches associated with the operator positions of the switchboard, is connected individually to a relay in the associated marking control circuit. The test lead of each circuit is connected to the associated marking control circuit and extended by the marking control circuit to test terminals which appear in the banks of the finder switches. A start lead from each marking control circuit is connected to the common start lead of the finder switches.

The marking control circuit is connected in multiple to terminals in the banks of the group of storage switches and is also connected to the common storage control circuit thru which the operation of the storage switches is started. When a call is received on one of the circuits, a relay in the associated marking control circuit is operated over the start lead. This relay connects markings to the test terminals multipled thru the banks of the storage switch group and causes a relay in the storage control circuit to operate. The storage control circuit thru the storage distributor closes a start circuit to an individual one of the storage switches and causes this switch to hunt for the markings set up in its banks by the marking control circuit.

The storage switch finds the marked bank terminals and thru some of them connects itself to the marking control circuit causing this circuit to disconnect its markings from the banks of the storage switches. The storage distributor then connects another one of the storage switches to the storage control circuit so that this other storage switch may hunt for and connect to a marking control circuit operated by a subsequent incoming call and the storage distributor also operates to insure that the call connected to by the first storage switch will be accepted by an operator position before any subsequent call is accepted.

At the time that an operator position accepts an incoming call, the storage control circuit, the storage distributor and the storage switch connected to the first waiting call are controlled from the operator position to operate the marking control circuit to extend the test lead of the incoming circuit to the test terminals of the finder switches associated with the operator positions and to close a circuit to the common start for the finder switches. One of the finders associated with the answering operator position will hunt for the marked test terminal and connect the operator position thru to the incoming circuit. The connection of the finder switch to the incoming circuit further operates the marking control circuit to place it under control of the calling circuit and the operator position and to release the connected storage switch. The storage switch on releasing is returned to control of the storage distributor and becomes available for other connections. The storage distributor at this time also makes available to operator positions the incoming circuit associated with the next storage switch.

A control key is provided which, when operated, makes the storage feature inoperative and places the marking control circuit directly under control of its associated circuit. Another control key is provided which, when operated, makes the storage feature ineffective until all available operator positions are busy. When one or more incoming calls are waiting to be answered and all operator positions are busy, the storage feature becomes effective and will remain so until all stored calls are answered and an operator position is available to accept an incoming call.

While only one group of storage switches, one storage control circuit and one storage distributor are shown, it may be noted that similar apparatus can be arranged so that different groups of circuits can be accepted thru different groups of storages switches by other operator positions.

It is an object of the present invention to provide for distributing calls to the operator positions of a switchboard in the same order that the calls are received at the switchboard.

It is another object of the invention to provide for storing calls in the sequence in which they are received at the switchboard and subsequently distributing the calls to the operator positions of the switchboard in the same sequence.

One feature of the invention is to provide, for each circuit on which incoming calls may be received, a marking control circuit which makes the marking for the incoming call effective in the finder banks after the marking control circuit has been operated under the joint control of its associated circuit, one of the storage switches, and an operator position.

Another feature of the invention provides for operating the marking control circuit from its associated line independent of the storage switches.

Another feature of the invention provides storage switches that accept calls, under control of a storage distributor, in the order that the calls are received at the switchboard, store the calls, and release the calls to operator positions, under control of the operator positions and the storage distributor, in the same order that the calls were accepted.

Still another feature of the invention provides a control key for making the storage switches and storage distributor effective only in case all operator positions are busy, after which the storage switches continue to function until all stored calls have been accepted by operator positions and idle operator positions are available to accept calls as they are received at the switchboard.

A further feature of the invention provides for releasing a storage switch as soon as the call stored therein has been accepted by an operator position, the storage switch immediately returning to its proper position, under control of the storage distributor, for accepting and storing a subsequent call.

A still further feature of the invention provides a timing device for automatically operating the storage control circuit and the storage distributor in case the storage switch that is conditioned to accept a call does not start or if a call is released from storage and is not accepted by an operator position.

Another feature of the invention provides a control device for releasing all calls from storage.

Another feature of the invention provides for testing the storage switches, the storage control circuit and the storage distributor.

The above features and others not particularly mentioned at this time will be described in detail in the following specifications with the aid of the accompanying drawings comprising Figs. 1 to 10 inclusive, Fig. 10 illustrating the manner in which Figs. 1–9 shall be assembled.

Figure 1:
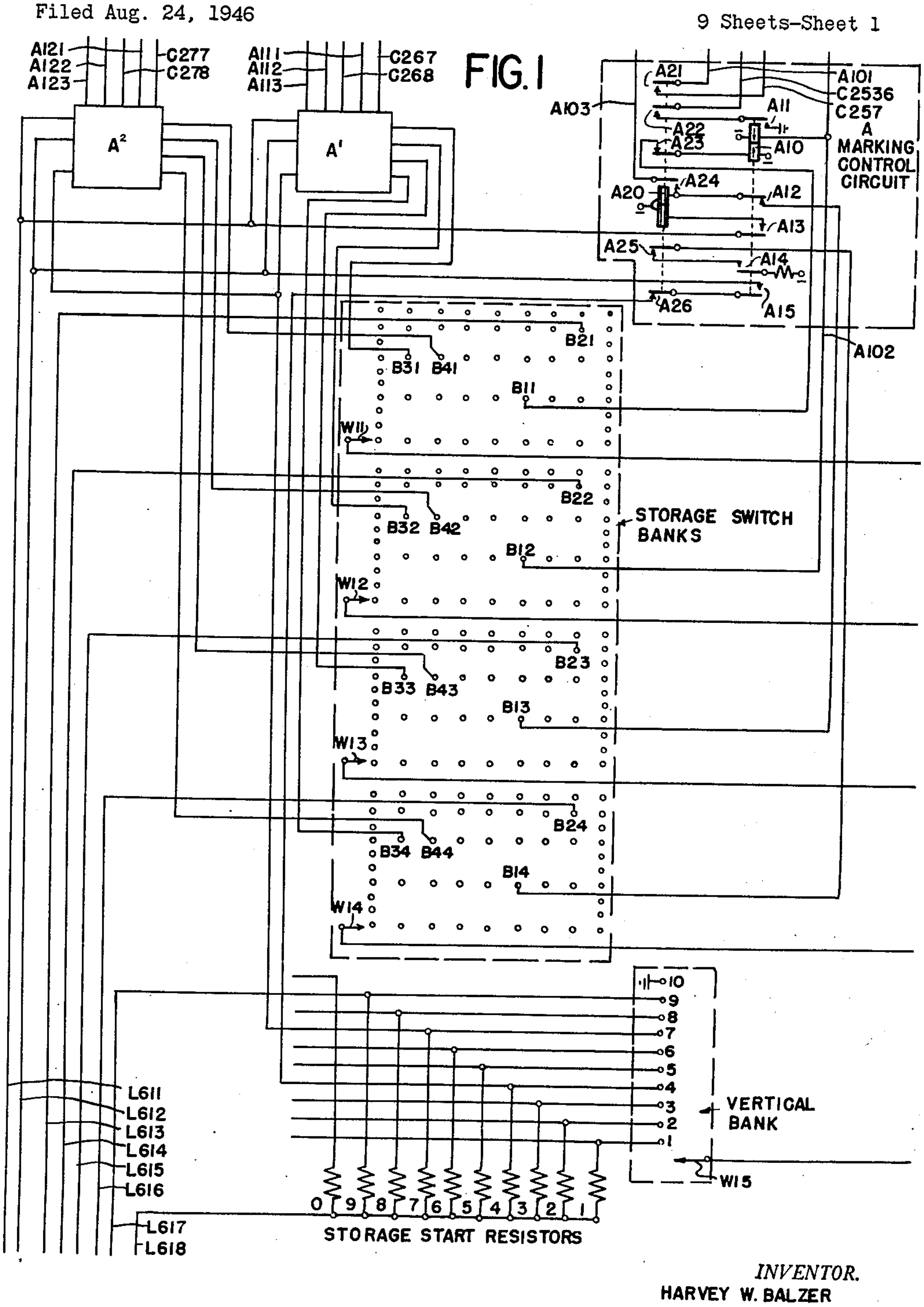
Fig. 1 shows one marking control circuit in detail connected to the banks of a storage switch, and by block diagrams two similar marking control circuits with connections to the banks of the storage switch.
Figure 2:
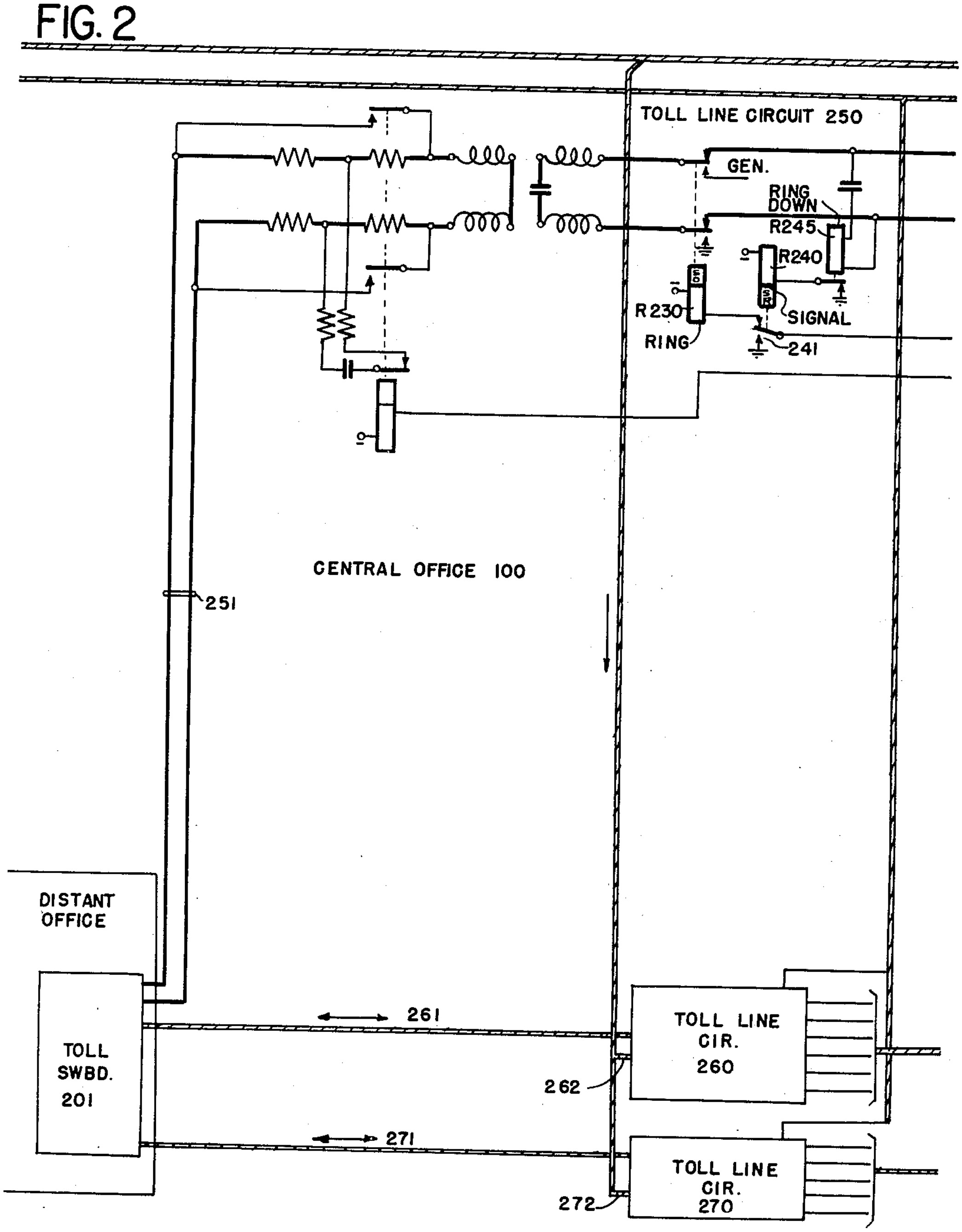
Figs. 2 and 3 show one toll line circuit in detail with connections to the marking control circuit in Fig. 1 and to a switchboard in a distant exchange and two similar circuits are shown by block diagram with connections to marking control circuits in Fig. 1.
Figure 3:
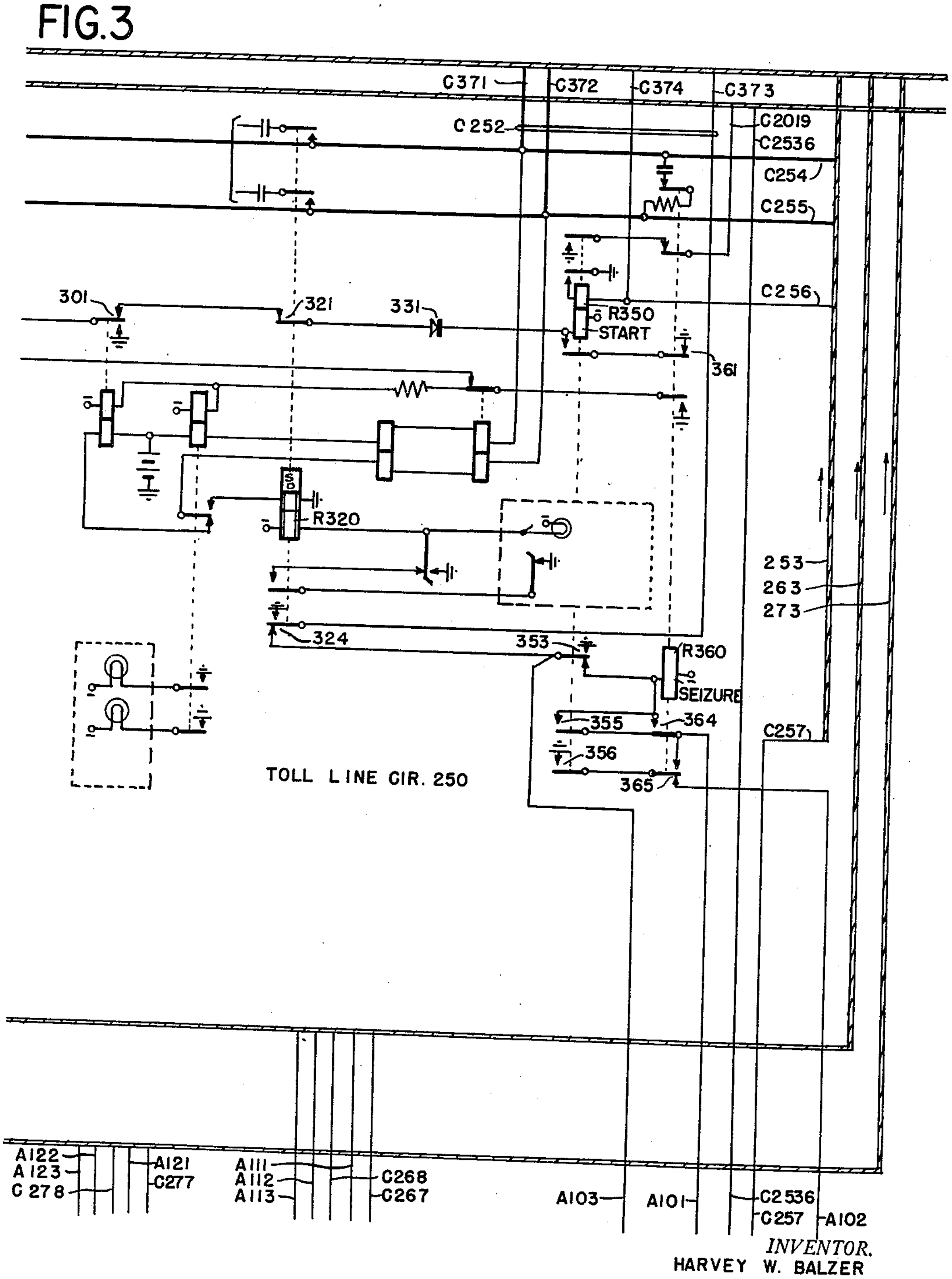

There is a large number of line circuits, such as ring down toll line circuit 250 shown in Figs. 2 and 3, each connected to a distant toll switchboard such as toll switchboard 201. The leads of these lines terminate in the banks of finder switches such as finder switch 900 and are multiplied to the banks of other similar finder switches. Each toll line circuit is connected to a marking control circuit such as circuit A, Fig. 1. It may be noted that Figs. 2 and 3 of this drawing are similar to Figs. 2 and 3 of the drawing for the Imre Molnar Patent No. 2,361,313, and can be substituted for the corresponding figures in the above mentioned patent, and that thereafter Figs. 1 and 4 to 8 inclusive may be applied to Patent No. 2,361,313.

The marking control circuit A, in Fig. 1 is individual to the toll line circuit 250, and is one of a number of such circuits, two of which are indicated at $A^1$ and $A^2$ associated with toll line circuits 260 and 270 respectively. The marking control circuits, such as A, are connected to the banks of storage switches, such as the storage switch banks in Fig. 1, which are individual to storage switch 400, Fig. 4. There are a number of storage switches, such as 400, each having similar banks and having wipers such as wipers W11 to W15 inclusive. The marking control circuits, such as A, are connected to each of the storage switch banks so that each of the storage switches has access to any one of the marking control circuits by means of its associated banks and wipers.

Figure 6:
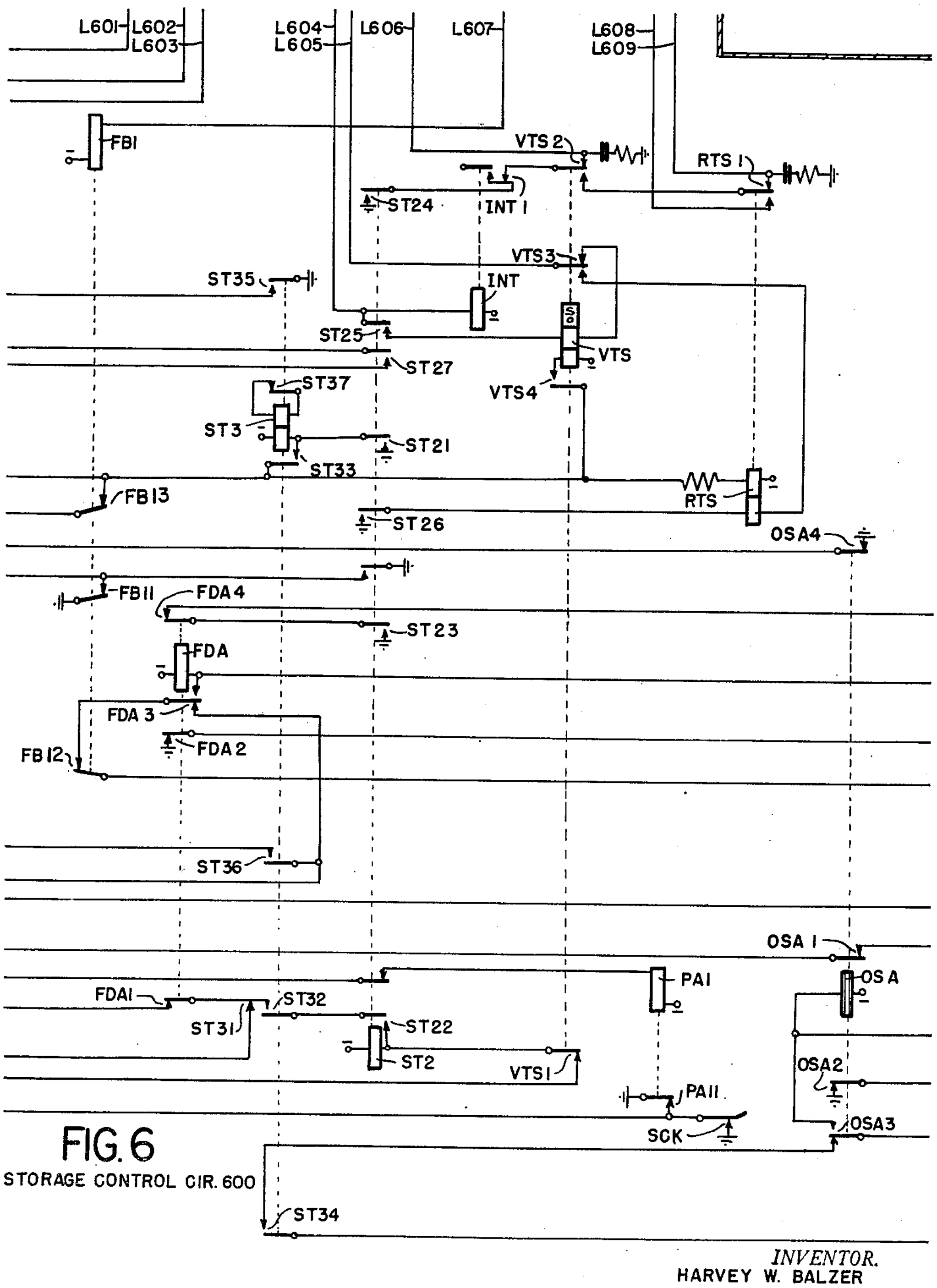
Figs. 6–8 show the storage control circuit with connections to Figs. 1, 4 and 5 and also to a position distributor circuit such as shown in Fig. 9.
Figure 7:
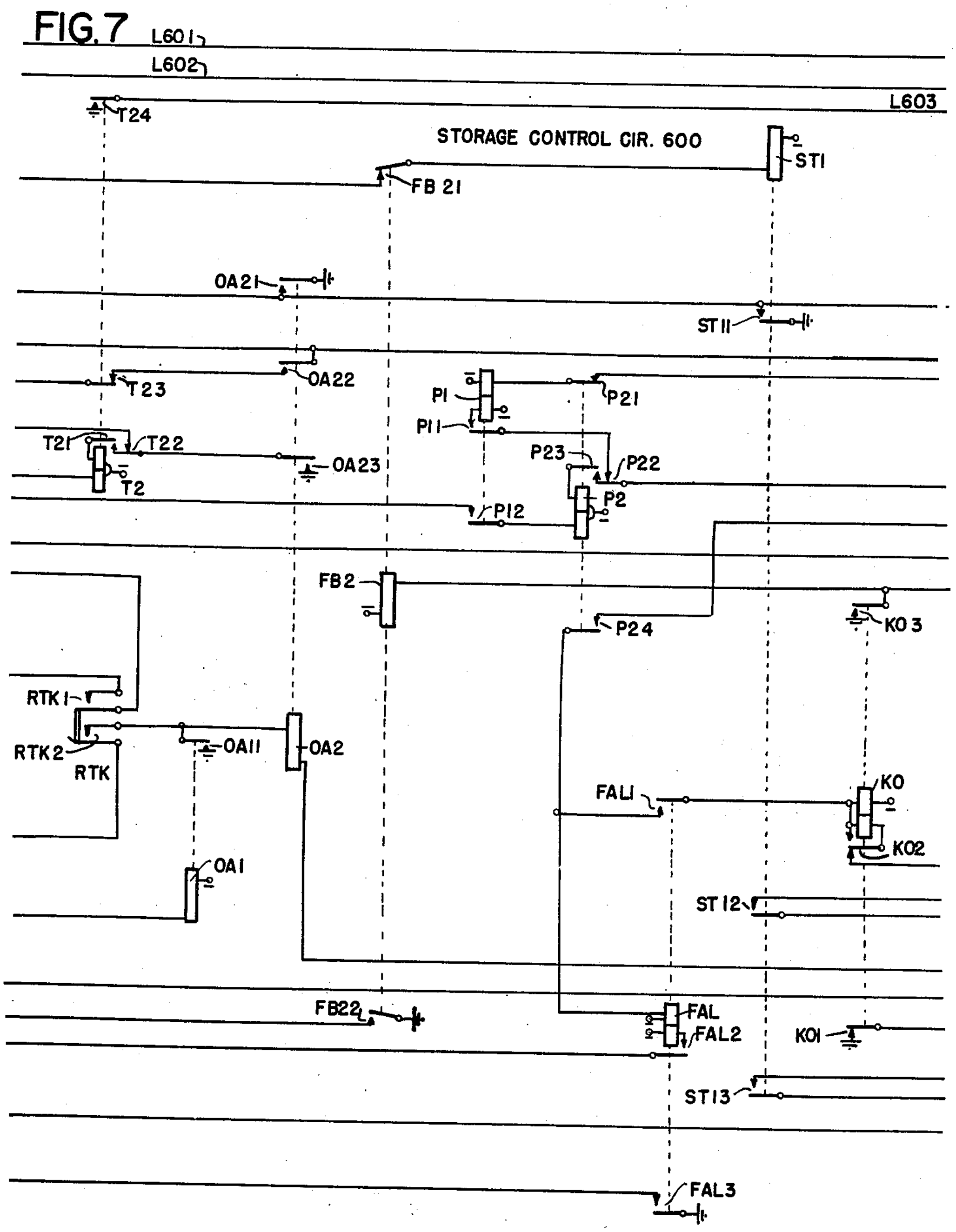
Figure 8:
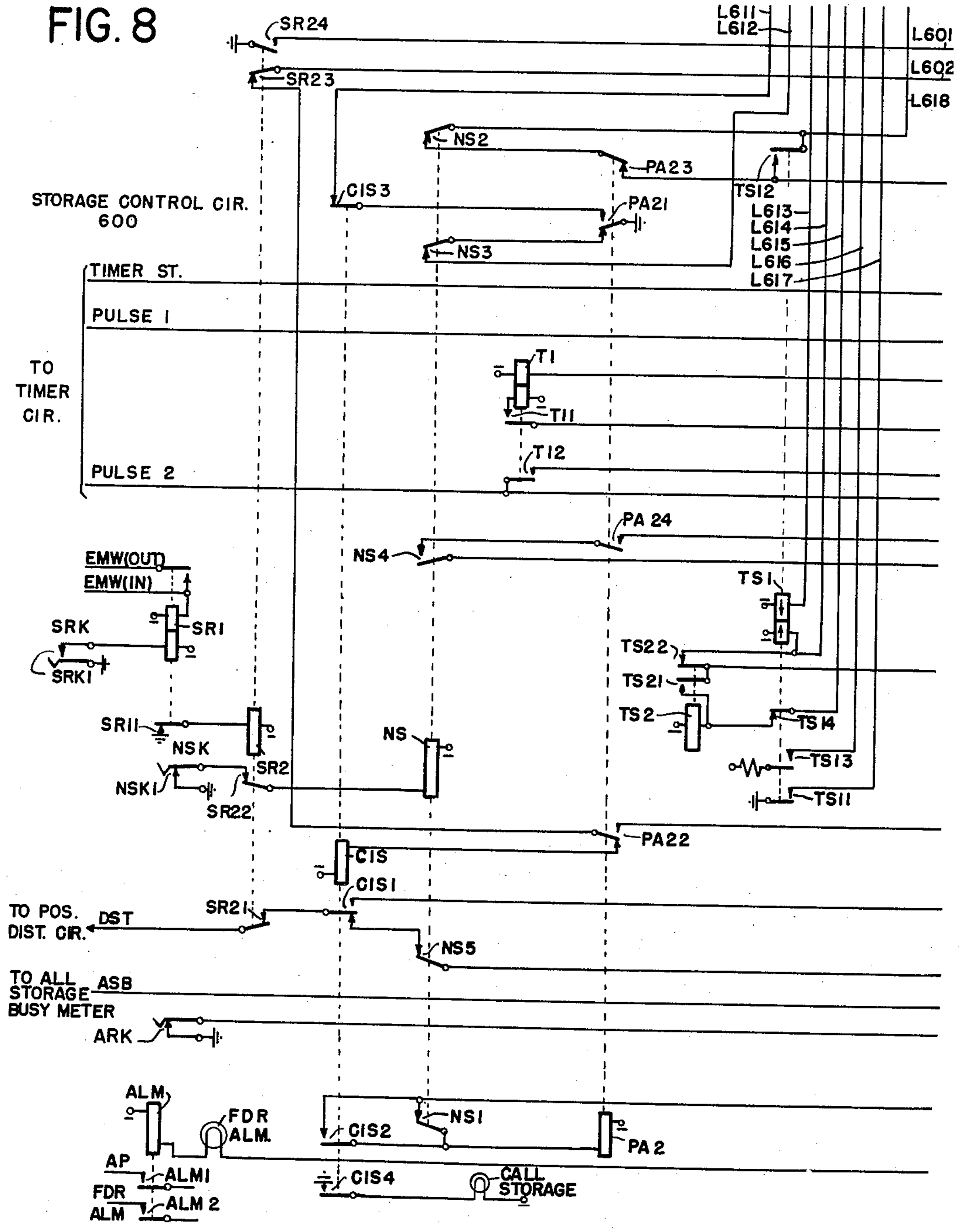
Figure 9:
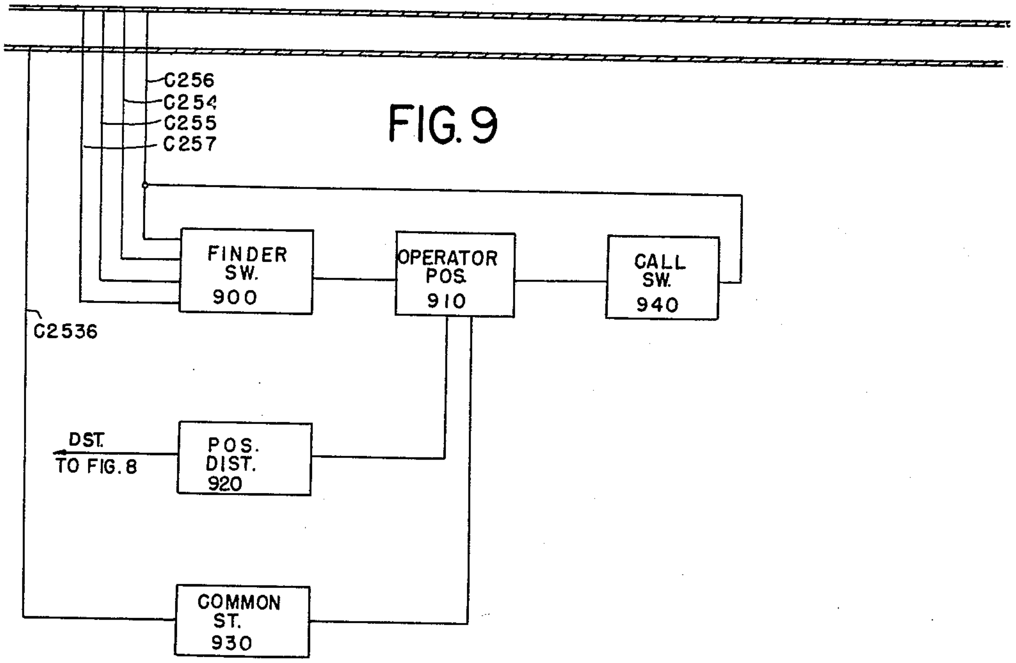
Fig. 9 shows an operator position with an associated finder switch, a call switch, a position distributor and a common start circuit.
Figure 10:
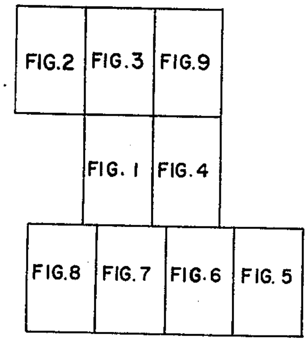

The marking control circuits, such as A, are also connected to storage control circuit 600, which is shown in Figs. 6, 7 and 8. When a marking control circuit is operated by its associated line circuit, in response to an incoming call on the line, the marking control circuit causes the storage control circuit to operate and extend a starting circuit thru the storage distributor 500, shown in Fig. 5, to one of the storage switches, such as storage switch 400. The storage switch is a finder switch of the well known vertical and rotary type which first hunts for a marked level and then hunts for a marked terminal in the marked level. When its wipers are moved to the terminals of an operated marking control circuit, the storage switch stops and, thru its wipers, remains connected to the marking control circuit. The connection of the storage switch to the marking control circuit further operates the marking control circuit to remove its markings from the storage switch banks thus preventing another storage switch from connecting to the found marking control circuit.

The storage distributor 500 operates under control of the storage control circuit 600, selecting individual storage switches to hunt for operated marking control circuits, and marking the storage switches in the order of their selection, for release under control of operator positions, such as operator position 910. As each storage switch connects to a marking control circuit, the storage distributor operates and selects another storage switch to hunt for operated marking control circuits and as each storage switch releases, the storage distributor operates to make another storage switch accessible to the operator positions. Operator positions such as operator position 910 have access to the storage distributor thru the position distributor circuit 920 and the storage control circuit 600.

A timer, connected to the storage control circuit 600, is started each time the storage control circuit is conditioned to start a selected storage switch. In case the storage switch does not function, and the storage control circuit cannot advance the storage distributor within a pre-determined time, the timer will cause the storage distributor to be advanced, and another storage switch will be selected to connect to the marked terminals.

The finder switches, such as finder switch 900, the operator positions, such as operator position 910, the position distributor circuit 920, the common start circuit 930, and the call switches such as call switch 940 are of the type shown in the Imre Molnar Patent No. 2,361,313, which may be referred to for a detailed description of these circuits.

The finder switches, such as 900, are of the well known vertical and rotary type having banks and wipers suitable for engaging the bank contacts. Circuits suitable for receiving incoming calls terminate in the bank contacts of the finder switches. Control leads for these circuits may be taken thru marking control circuit A. The finder switches are connected to operator positions, such as operator position 910, and constitute one end of the connecting links in the operator positions.

The operator positions such as 910 each have a number of connecting links which terminate on one end in finder switches, such as finder switch 900, and on the other end terminate in call switches, such as the call switch 940. Each operator position includes a telephone circuit and common equipment for performing the services of a toll operator. The operator's telephone circuit and common equipment are connected to the links by control keys and relays individual to the links. Each operator position is connected to the position distributor circuit 920 and to the common start circuit 930. The position distributor circuit 920 is connected over the lead DST to the storage control circuit, Fig. 8. The common start circuit 930 is connected to marking control circuits such as marking control circuit A.

The call switches, such as call switch 940, are of the well known vertical and rotary type having access thru banks and wipers to toll line circuits, such as toll line circuit 250, and to other lines and trunks by means of which the operators can establish connections to other offices or to local subscriber lines in the central office 100.

The storage release key, SRK, when operated, releases all operated storage switches. With the key SRK operated, the marking control circuits operate under control of their associated lines and finder switches such as the finder switch 900.

The no storage key, NSK, when operated, allows all stored calls to be answered in sequence but prevents the storage of additional calls. After all stored calls have been answered and with the key NSK operated, the marking control circuits operate under control of their associated lines and finder switches such as the finder switch 900.

The storage control key, SCK, when operated, permits the marking control circuits to operate under control of their associated lines and finder switches, such as finder switch 900, as long as an idle operator position, such as operator position 910, is available to answer calls. With the key SCK operated and with all operator positions busy, the marking control circuits will operate under control of their associated lines, and storage switches, such as storage switch 400, which will store incoming calls received under this condition and later release these calls to operator positions in the same order that they were received. Should the key SCK remain operated after all stored calls have been accepted by operator positions and an operator position has become available to accept calls, the marking control circuits may again be operated under control of their associated lines and finder switches such as finder switch 900.

The routine test key, RTK, is provided for testing the performance of the storage control circuit 600, the storage distributor 500, and, in sequence, each of the storage switches, such as storage switch 400. Terminals in the banks of each of the storage switches are connected to the storage control circuit and are marked by the operation of a relay controlled by the operation of the key RTK. This key also causes the storage control circuit and the storage distributor to operate one of the storage switches which in turn connects itself to the marked terminals. The connection of a storage switch to the marked terminals operates another relay in the storage control circuit which causes the storage switch to release and the storage distributor to select another storage switch. This storage switch in turn connects to the marked terminals, releases and permits the operation of another storage switch under control of the storage control circuit and the storage distributor. The operation and release of the storage switches one at a time continues until the key RTK is restored. To make certain that the routine test of this equipment does not interfere with regular calls, the key SRK should be operated, to release all stored calls, before the key RTK is operated, and the key SRK should remain operated until after the key RTK is restored. The timer connected to the storage control circuit functions when the routine test is performed to advance the storage distributor in case one of the storage switches fails to start or to release. The difference in time required for the advancement of the storage distributor by the operation and release of a storage switch and that required by the timer is great enough to permit the tester to determine that faulty operation has occurred and by observing the operation of the individual storage switches the faulty switch can be detected.

Under normal conditions, immediately after battery has been connected to the storage control circuit 600 and before any incoming calls have been received, the relay SR2 is operated from ground at armature SR11 and closes a circuit to the relay NS thru armature SR22 and contacts NSK1 to ground. The relay NS operates and at armature NS1 closes a circuit to the relay PA2 from ground at key SCK. The relay PA2 operates and connects the relay CIS thru armatures PA22 and SR23 to the storage switch 400 over lead L602 which is multipled to all storage switches controlled by the storage control circuit 600. The relay FB1 is energized from ground over lead L607 and at armature FB11 closes a circuit to the relay FB2 which operates and connects the relay ST1 thru armatures FB21, PA23, and NS2 over lead L618 to the storage start resistors in Fig. 1. Ground thru armatures PA21 and NS3 is connected over lead L612 to the make contact associated with armature A15 and to similar contacts in all marking control circuits, such as A1 and A2 associated with storage control circuit 600.

Assume now that a call is initiated at the toll switchboard 201 over line 251 which terminates in the toll line circuit 250 shown in Figs. 2 and 3. When the toll line is seized at the toll switchboard and ringing current is projected thereover, the shaded pole, alternating current, ring-down relay R245 is actuated and thereby opens the energizing circuit for the slow-to-release signal relay R240. The relay R240 restores and closes an energizing circuit from ground thru armatures 241, 301 and 321, rectifier 331, lower winding of start relay R350, to battery. Start relay R350 completes a locking circuit for its lower winding from ground at armature 361. This locking circuit for the start relay R350 is provided so that the relay will remain operated after the ringing has ceased and the normally operated signal relay has been permitted to operate again. The start relay R350 at armature 353 disconnects idle indicating battery potential from conductor C373 and connects conductor C373 to ground to prevent the seizure of toll line circuit 250 for outgoing use at central office 100. At armature 355, start relay R350 connects battery potential by way of the winding of the seizure relay R360 and lead A101 to armature A21 in Fig. 1, and at armature 356 closes a circuit thru armature 365, lead A102 and the upper winding of the relay A10, Fig. 1, to battery.

The relay A10 operates and thru armatures A14 and A25 connects battery potential to terminals in the storage switch banks. At armature A15, relay A10 connects ground to vertical bank contact 4 and to storage start resistor 4 over a circuit which may be traced from armatures PA21 and NS3 in Fig. 8, lead L612, and armature A26. The ground on vertical bank contact 4 marks this level to the storage switches, such as the storage switch 400, so that when a switch is hunting it will stop its vertical motion at level 4 and hunt over the level 4 for a waiting call. The ground on the storage start resistor 4 is extended thru the resistor 4, armatures NS2, PA23 and FB21, and the winding of the relay ST1 in Fig. 7, to battery, to thereby operate the relay ST1.

Assume now that the storage control circuit 600 is normal, that the relays FD1, FD2, FD3 and all similar relays in the storage distributor 500 are not operated, and that all of the relays such as the relay OS1 are normal. The relay ST1 energizes the relay ST2, Fig. 6, from ground thru armatures KO1 and FDA1, contacts ST31, armatures ST13 and VTS1, and the coil of the relay ST2, to battery and energizes the relay FD1, Fig. 5, from ground thru armatures FDA2, FD31, FD21, FD11, FB12, FDA3, ST12, F11, and the winding of the relay FD1, to battery. The relay ST2 operates, connects its winding thru armature ST22 to armature ST32, energizes the lower winding of ST3 from ground at armature ST21, and connects ground thru armatures ST23 and FDA4 to a make contact of the relay FD1. The FD1 relay operates armature FD12 first, connecting its winding thru armatures FD12, FD23 and FD33 to the winding of the relay F1, which is short circuited by direct ground connected to the winding of relay FD1 thru armature F11 over a circuit previously traced. The relay FD1 operates in full, armature FD11 opening the starting circuit to FD1 and opening the short circuit around the winding of relay F1, armature FD13 connecting ground over the lead L511 to energize the relay FT in storage switch 400, Fig. 4, and armature FD14 connecting the lead L512 to the winding of the relay FDA. Relay F1 operates for a purpose to be explained later. The relay ST3, energized as previously described but slightly slow to operate because its upper winding is short circuited at armature ST37, now operates its armatures, armature ST33 energizing the upper winding of the relay RTS from ground at armature ST21, armature ST32 closing a holding circuit to the relay ST2 from ground thru armatures KO1, FDA1, ST32 and ST22, and armature ST34 closing a circuit to the relay OS1 from ground thru armatures OSA2, OS33, OS23, OS13, OSA3, ST34, and S11, and the winding of relay OS1 to battery. The relay OS1 operates its armature OS11 first, connecting ground thru the winding of the relay S1 and armatures OS32, OS22 and OS11 to its winding. As the OS1 relay continues its operation, it opens its starting circuit at armature OS13 and thus completes its operation in series with the relay S1 which also operates and further opens the starting circuit to the OS1 relay at armature S11. The relay OS1 at armature OS13 prepares a circuit to the relay OS2, at armature OS12 prepares a circuit to the relay OSA over the lead L513, and at armature OS14 prepares a circuit to the OA2 relay over the lead L514. The function of the OS1 relay will be explained later. The relay FT, Fig. 4, energized over the lead L511, operates its armatures, energizing the magnet VERT thru armature FT6 over a circuit which may be traced from ground thru armature ST24, contacts INT1, armatures VTS2, FT6, and SW1, thru the windings of magnet VERT, to battery. The vertical wiper W15 is connected thru armatures FT7 and VTS3, the upper winding of the relay VTS and the armature ST25 to the winding of the relay INT. The magnet VERT operates, stepping the wipers W11, W12, W13, W14 and W15 to the first level, the wiper W15 contacting the vertical bank contact 1, and at armature VERT1 energizing the relay INT. The relay INT operates and at contact INT1 opens the circuit to magnet VERT. The magnet VERT restores and at armature VERT1 opens the circuit to the relay INT. Assuming that the vertical bank contact 1 is not marked with direct ground, the relay INT restores and at contact INT1 energizes the magnet VERT which operates, moves the wipers to the second level, and energizes the relay INT thru armature VERT1. The relay INT operates and opens the circuit to the magnet VERT, which in turn restores and opens the circuit to the relay INT. This action continues until the vertical wiper, W15, is stepped to a vertical bank contact having direct ground connected thereto, the wipers being moved one level each time the magnet VERT operates. In this case, the vertical bank contact 4 is connected to ground, as previously described. When the magnet VERT restores and the vertical wiper, W15, is in contact with the vertical bank contact 4, a circut to the upper winding of the relay VTS in series with the relay INT may be traced from ground on vertical bank contact 4, wiper W15, armatures FT7 and VTS3, upper winding of relay VTS, armature ST25, winding of relay INT, to battery. The relay INT remains operated thus preventing further operation of the magnet VERT and the relay VTS operates its armature VTS4, energizing its lower winding from ground thru armatures ST33 and ST21. The relay VTS operates in full, opening the circuit to its upper winding and the relay INT and connecting the wiper W14 to the lower winding of the relay RTS at armature VTS3, and at armature VTS2 opening the incomplete circuit to the magnet VERT and preparing a circuit to the magnet ROT. The relay INT now restores and a circuit may be traced from ground thru armature ST24, contact INT, armatures VTS2, RTS1, FT5, SW2 and the windings of the magnet ROT, to battery. The magnet ROT operates, steps the wipers W11, W12, W13 and W14 onto the first bank contacts of level 4 and energizes the relay INT from ground at armature ROT1. The relay INT operates and opens the circuit to the magnet ROT at contact INT1, causing the magnet ROT to restore and open the circuit to the relay INT at armature ROT1. If the wiper W14 does not encounter battery potential on the bank contact to which it has been connected, the relay INT restores and reoperates the magnet ROT which in turn steps the wipers to the next set of bank contacts and reoperates the relay INT from ground at armature ROT1. This operation continues until the wiper W14 encounters battery potential on the bank contact to which it is stepped. Assuming that none of the other contacts over which the wiper W14 passes have battery potential connected to them, then when the wiper W14 is stepped onto the seventh contact, a circuit is completed from battery thru armatures A14 and A25, wiper W14, armatures FT7 and VTS3, lower winding of relay RTS, and armature ST26, to ground. The upper winding of the relay RTS is energized from ground at armature ST33 as previously described but is not strong enough to operate the armature RTS1. However, the lower winding of the relay RTS co-operating with its upper winding operates armature RTS1, opening the circuit to the magnet ROT and preparing a circuit to the relay SW. The magnet ROT restores and opens the relay INT which restores and energizes the relay SW from ground thru armature ST24, contact INT1, armatures VTS2, RTS1 and FT4, and the winding of relay SW, to battery. The relay SW operates, opens the incomplete circuits to the magnets VERT and ROT at armatures SW1 and SW2, prepares a circuit to the lower winding of the relay SR4 at armature SW3, energizes the relay CIS, Fig. 8, from ground thru armatures SW5, SR41, SR23 and PA22, and the winding of relay CIS to battery, closes its own locking circuit from ground thru armatures SW11, AS1 and SR42, and energizes the relay FDA, from ground thru contacts BSY11, armature SW8, the lead L512, armature FD14 and the winding of relay FDA, to battery. The wiper W12 when stepped to the seventh set of bank contacts is connected to the grounded terminal of the relay A10. This ground is extended over wiper W12, armatures SW6 and FT3 thru the upper winding of the relay SX to battery. The relay SX operates and a circuit may now be traced from ground at wiper W12, armatures SW6, SX2 and SW7, wiper W11, B11, armature A23, and the lower winding of relay A10 to battery. The windings of the relay A10 are connected differentially, and as both windings are now energized in opposite directions the relay A10 releases, disconnecting battery at armature A14 from the bank contact B14 so that other storage switches will not connect to the marking control circuit A, and disconnecting ground at armature A15 from vertical bank contact 4 and from storage start resistor 4 so that other storage switches will not hunt over level 4 unless another marking control circuit associated with level 4 is operated. The relay CIS, which was energized when the relay SW operated, operates and connects the DST lead to the relay OA1, the purpose of which will be explained later. The relay FDA, energized by the operation of the relay SW, operates and at armature FDA4 opens the circuit to the relay FT, at armature FDA3 closes a circuit to the relay FD2, and at armature FDA1 opens the circuit to the relay ST2. The relay FD2 operates its armature FD22 first, connecting its winding thru armature FD33 and the winding of relay F1. The relay FD2 then operates in full, opening the circuit to the relay FD1 at armature FD23. The relay ST2, opened when the relay FDA operated, restores its armatures, opening its holding circuit at armature ST22, opening a part of the incomplete ground circuit to the lead L511 at armature ST23, and at armature ST21 opening circuits to the relays ST3, VTS and RTS allowing them to restore. When the relay A10 restores, after the operation of the relay SX, ground is disconnected from storage start resistor 4 thus opening the circuit to the relay ST1 which thereafter restores its armatures. The relay FT, opened by the operation of the relay FDA, restores its armatures. The relay FD1, opened by the operation of the relay FD2, restores its armatures, further opening the circuit to the relay FT at armature FD13, and opening the relay FDA at armature FD14. The relay FDA restores, at armature FDA1 prepares a circuit to the relay ST2, and at armature FDA4 prepares a circuit to the lead L521. The relays FD2 and F1 remain operated so that operation of the storage control circuit in response to other incoming calls will cause the storage switch 401 to connect itself to the marking control circuit associated with the calling line.

It may be noted that the vertical off normal springs VON11 and VON12 are operated at the time the magnet VERT moves the wipers thru their first vertical step. The VON spring 11 prepares a circuit to the release magnet RLS which is prevented from operating as its circuit is opened, first at armature FT1, by the operation of the relay FT and later, at armature SX6, by the operation of the relay SX. A holding circuit to the relay SW may now be traced from ground thru spring VON11, armatures SX6, and SR42 thru the winding of relay SW to battery. The vertical off normal spring VON12 prepares a ground circuit to the lead L512 to control the operation of storage distributor 500 in case the FT relay releases before the SW relay operates.

The storage switch 400 is now connected to the marking control circuit A thru wipers W11–W14 inclusive, the relay SW being operated from ground at spring VON11 and from ground at armature SW11, and the relay SX being operated from ground on wiper W12. Battery thru the lower winding of the relay AS, thru armatures SW9 and FT8 is connected to the lead L514 and thru armatures OS14 and OSA1 to the winding of the relay OA2 in Fig. 7. In marking control circuit A, the relay A10 is at normal as its two windings are energized differentially and the upper winding of the relay A20 is connected thru wiper W13 to the storage switch 400. In the storage control circuit 600, the relay C1S, in addition to other normally operated relays, is operated over a circuit previously traced, and the DST lead is connected thru armatures SR21 and C1S1 to the winding of the relay OA1. In the storage distributor circuit 500, the relays FD2 and F1 are operated in series and the relays OS1 and S1 are operated in series.

Figure 4:
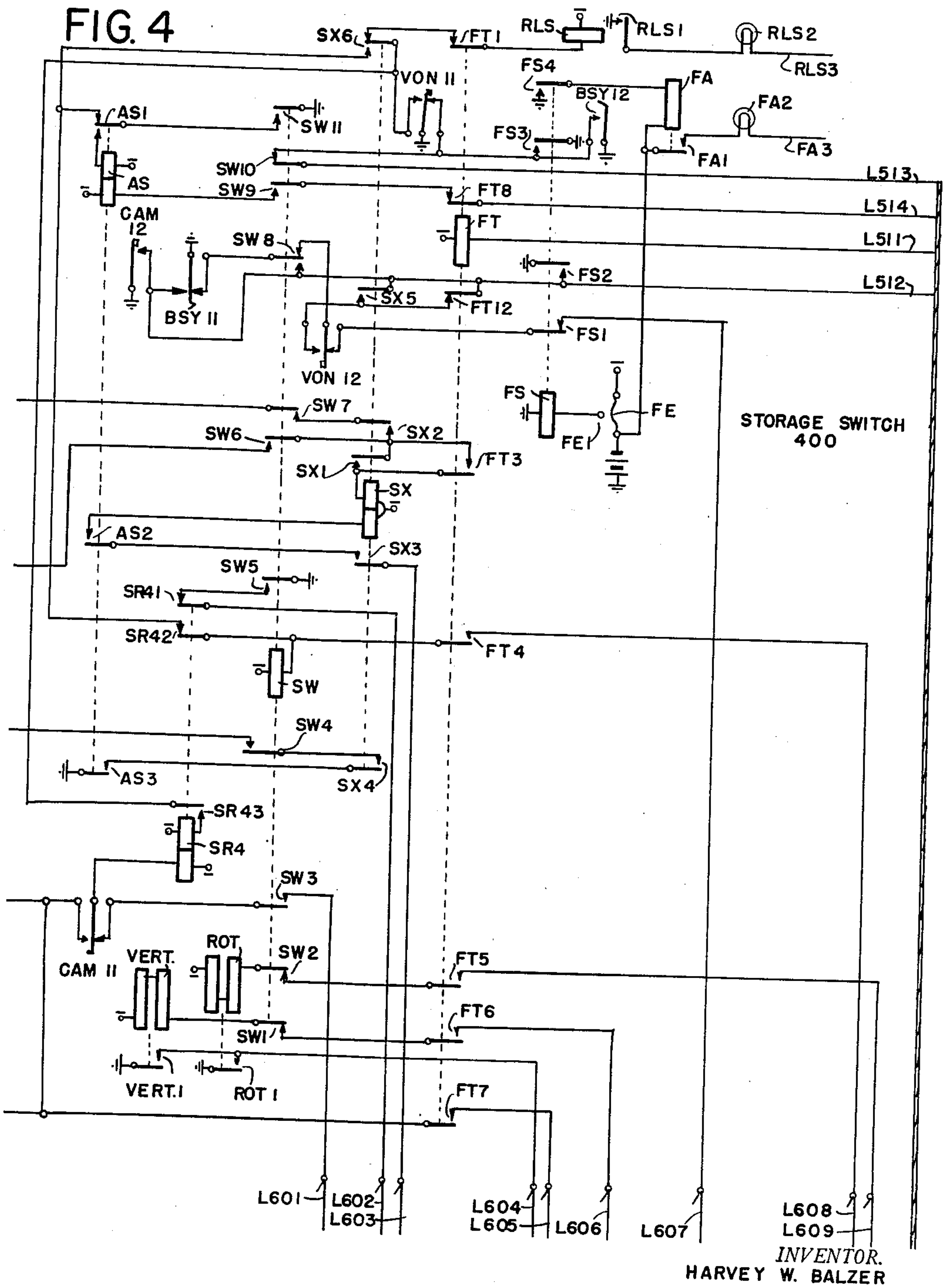
Fig. 4 shows the storage switch associated with the banks in Fig. 1.
Figure 5:
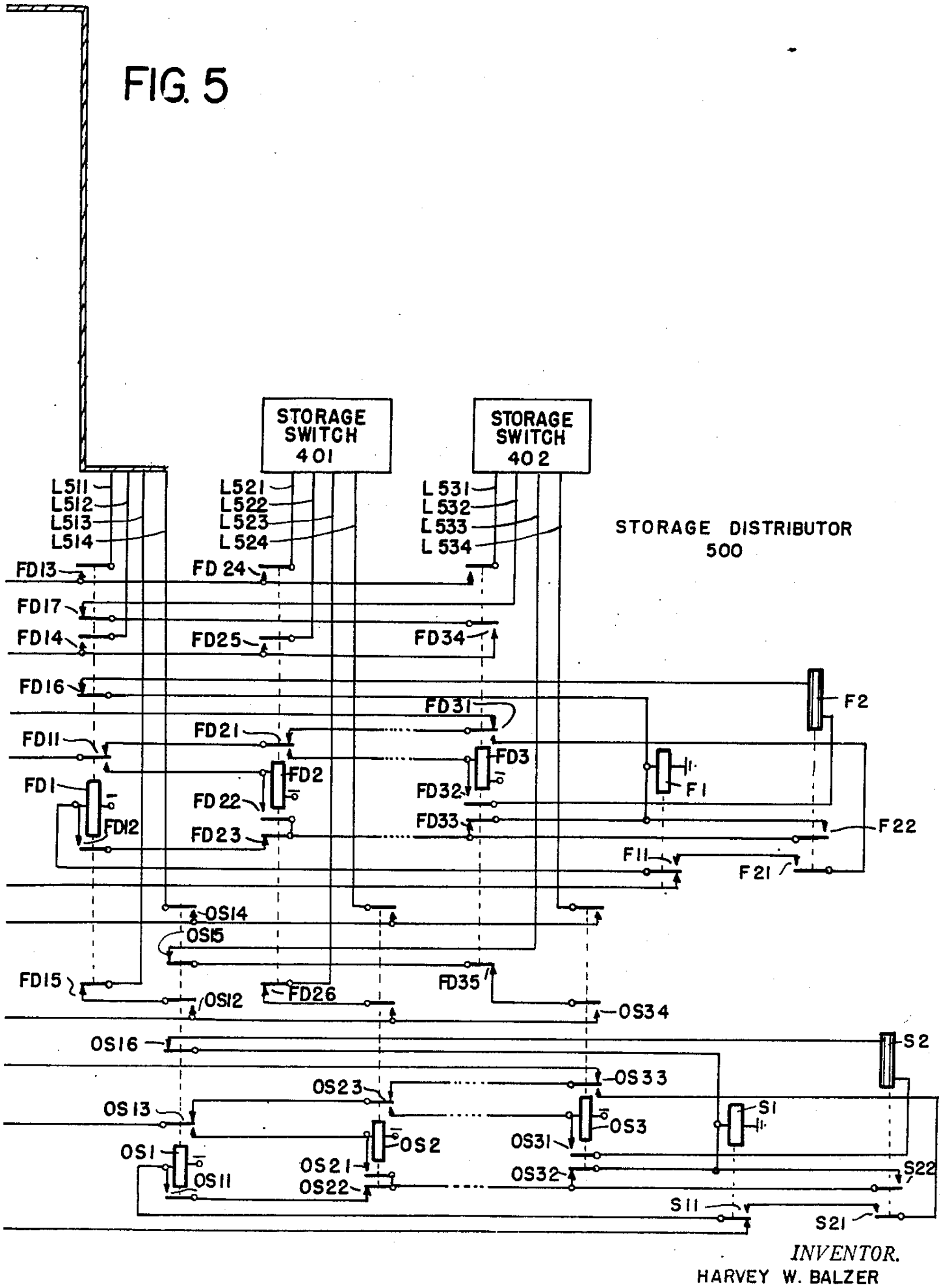
Fig. 5 shows the storage distributor circuit with storage distributor relays for the storage switch in Fig. 4 and similar relays for connection to two similar switches.

Assuming now that the operator at operator position 910 is ready to receive a call on the connecting link including the finder switch 900, the operator throws a control key associated with the link causing the position distributor circuit 920 to connect ground to the DST lead thereby operating the relay OA1 which, at armature OA11, energizes the relay OA2 and the lower winding of the relay AS, Fig. 4, in series over a circuit previously traced. Relay OA2 operates for a purpose to be later explained.

The relay AS operates, at armature AS3 energizes the relay A20 from ground thru armatures AS3, SX4, SW4, wiper W13, contact B13, armature A12 and the upper winding of the relay A20, to battery, and at armature AS1 opens a holding circuit to the relay SW and energizes its own upper winding from ground at armature SW11. The relay A20 operates, closing a holding circuit to itself at armature A24 from ground at armature 353, Fig. 3, connects battery thru the winding of the relay R360, Fig. 3, thru armatures 355 and A21 over lead 257 to the test terminals of finder switches such as finder switch 900, prepares a circuit to the common start circuit 930 at armature A22, and opens the circuit to the lower winding of the relay A10. The relay A10 is operated by its upper winding, disconnecting the upper winding of relay A20 from contact B13 at armature A12, and connecting ground thru armatures A11 and A22 over lead C2536 to the common start circuit 930 which operates and causes the finder 900 to start hunting over its associated bank contacts.

When the wipers of the finder 900 reach the terminals associated with toll line circuit 250, battery potential thru the winding of the relay R360 connected to the finder 900 over lead C257 stops the hunting action of the finder. Ground, connected at the finder 900 to the lead C257, operates the relay R360 which connects a holding circuit to itself at armature 364, opens the circuit to the upper winding of the relay A10 at armature 365, and opens the circuit to the lower winding of the cutting tool 75 from the rivet hole formed R350 restores and at armature 353 transfers the holding circuit to the relay A20 thru armatures 364 and A21 to ground on lead C257.

The relay A10 restores when its circuit is opened at armature 365 and disconnects ground from the lead C2536 and the common start circuit at armature A11. The armature 365 also disconnects ground from the contact B12 thus opening the circuit to relay SX which restores and at armature SX6 opens the holding circuit to relay SW and closes a circuit to the release magnet RLS from ground thru spring VON11, armatures SX6 and FT1, and the winding of RLS, to battery. The relay SW restores, at armature SW11 opens the circuit to the relay AS which also restores, and at armature SW10 prepares a circuit to the lead L513. The release magnet RLS operates and causes the storage switch 400 to restore its wipers to normal. The vertical off normal springs are returned to normal when the wipers restore to normal, spring VON11 connecting ground thru armature SW10 over the lead L513 thru armatures FD15 and OS12 and the winding of the relay OSA, to battery. The relay OSA operates and at armature OSA3 closes a circuit to the relay OS2 thru armature OS13. The relay OS2 operates its armature OS21 first, closing a holding circuit to itself thru armature OS32 and the relay S1. The relay OS2 completes its operation, opening the circuit to the relay OS1 at armature OS22. The relay OS1 restores, at armature OS12 opening the circuit to the relay OSA, and disconnecting the lead L514 from the storage control circuit at armature OS14. The relay OSA restores its armature, opening the starting circuit to the relay OS2 at armature OSA3. It may be noted that the relay SW in restoring opens the circuit to the relay C1S at armature SW5 allowing relay C1S to restore and disconnect the relay OA1 from the lead DST. The relay OA1 restores and disconnects ground from the winding of the relay OA2 which also restores.

The relay R360 and the relay A20 are held by ground over the lead C257 under control of the finder 900 and operator position 910. When the call is terminated, the operator at operator position 910 releases the finder 900 thereby disconnecting ground from the lead C257 to allow relay R360 and relay A20 to release.

Should another incoming call be received on one of the toll line circuits such as toll line circuit 260 either before or after the call on toll line circuit 250 has been answered, the associated marking control circuit A1, the storage control circuit 600 and the storage distributor 500 will cause the storage switch 401 to connect itself to the marking control circuit A1 in the same manner as explained in the foregoing for the connection of storage switch 400 to marking control circuit A. Other relays similar to FD2 may be interposed between the relay FD2 and the relay FD3 for corresponding storage switches. When the storage switch 401 connects to the marking control circuit A1, the next FD relay will be operated, releasing the relay FD2 and preparing the next storage switch to connect itself to a waiting incoming call. In case an incoming call is received before the call stored in storage switch 400 is answered by one of the operator positions, the OS relays are not affected by the operation of the FD relays. The relay OS1 remains operated until ground is connected to the DST lead by one of the operator positions. The relay OS2 will then operate and the relay OS1 release as previously described. The answering of the second call by an operator position will operate a similar OS relay which may be interposed between the relay OS2 and the relay OS3 and release the relay OS2.

The FD3 relay is associated with the last storage switch in the group and is operated when the preceding FD relay is released consequent to the associated storage switch connecting to a marking control circuit. The relay FD3 in operating connects a holding circuit to itself thru armature FD32, the winding of the relay F2, armature FD16, and the winding of the relay F1 to ground. The relays F1 and F2 operate and a circuit is prepared to the relay FD1 thru armatures F11, F21, FD31, similar unoperated armatures are other FD relays such as armatures FD21 and FD11, and armature FB12 to the armature FDA3. When the storage switch associated with the relay FD3 connects to a marking control circuit, ground over the lead L532 thru armature FD17 and FD34 operates relay FDA which extends ground thru armature FDA3 over the circuit previously traced to operate the relay FD1. The relay FD1 opens the holding circuit to the relay FD3 at armature FD16 and closes a holding circuit to itself thru armature FD12, FD23 and F22 to ground thru the winding of the relay F1. The relay FD3 restores and transfers the holding circuit for the relay FD1 from armature F22 to armature FD33. The relay F2, which is slow to release, thereafter restores and remains at normal until the relay FD3 is again operated. In case another incoming call is received, the storage switch 400 associated with the relay FD1 will connect itself to the marking control circuit of the calling line and the relay FD2 will operate and the relay FD1 release as previously described.

The OS relays are operated, in a like manner, in response to the connection of ground to the DST lead which occurs each time a link in an operator position is conditioned to answer a call. The relay OS3 is associated with the last storage switch in the group and is operated when the call in the preceding storage switch is answered by an operator position. The relay OS3 holds in series with the relay S1 and the relay S2 which also operate and prepare a circuit to the relay OS1 thru armatures S11, S21, OS33, similar unoperated armatures on other OS relays such as armatures OS23 and OS13, to armature OSA3. When the storage switch associated with the relay OS3 is released by an operator answering the call stored therein, ground over the lead L533 thru armature OS15, FD35, and OS34 operates the relay OSA which, at armature OSA3, extends ground over the circuit previously traced to operate the relay OS1. The relay OS1 operates and opens the holding circuit to the relays OS3, S1 and S2 at armature OS16, and closes a holding circuit to itself thru armatures OS11, OS22 and S22 and the winding of the relay S1 to ground. The OS3 relay restores and transfers the holding circuit from armature S22 to armature OS32. The relay S2, which is slow to release, restores and remains at normal until the relay OS3 is again operated.

The relay FB1 is normally energized over the lead L607 thru armature FS1, contacts VON12, armature SW8, and contacts BSY11, to ground. The lead L607 is multipled to each of the storage switches in the group. Ground is removed from the lead L607 by the contacts VON12 of a storage switch that is off normal. When all of the storage switches are off normal, the circuit to the relay FB1 is opened. The relay FB1 restores, at armature FB12 disconnecting the armature FD11 from the armature FDA3 to prevent operation of the FD relays while all storage switches are off normal, and at armature FB11 opening the circuit to the relay FB2. The FB2 relay restores and at armature FB21 disconnects the ST1 relay from the storage start resistors to prevent further operation of the ST1 relay if other marking control circuits are operated while all storage switches are off normal, and at armature FB22 connects ground to the ASB leads which may be connected to a meter suitable for registering the all switch busy condition.

In case the storage switch 400 fails to find a call waiting on a level over which it is searching, or if it fails to switch thru to a waiting call, its wipers are moved to a position beyond the tenth set of bank contacts of the level and the springs CAM11 and CAM12 are operated. The lower winding of the relay SR4 is energized from battery thru its lower winding, spring CAM11, armatures FT7 and VTS3, lower winding of the relay RTS, and armature ST26, to ground. The relay SR4, at armature SR43, closes a holding circuit to its upper winding from ground at contact VON11 which is operated since storage switch 400 is off normal, at armature SR42 opens the incomplete holding circuit to the relay SW, and at armature SR41 opens an incomplete circuit to the relay C1S. Ground from spring CAM12 is connected to the lead L512 and extended thru armature FD14 to the relay FDA which operates, and at armature FDA4 opens the circuit to the relay FT. The relay FDA extends ground thru armatures FDA3, FB12 and FD11 to the relay FD2, which operates and releases the relay FD1. The relay FT releases and closes a circuit from battery thru the winding of the release magnet RLS thru armatures FT1 and SX6 to ground at contact VON11. The release magnet operates and allows the storage switch 400 to restore to normal. With the switch at normal, the contact VON11 is returned to normal to open the circuit to the release magnet RLS and to the upper winding of the relay SR4, and to connect ground thru armature SW10 to the lead L513. The circuit to the lower winding of the relay SR4 was opened at armature FT7 when the relay FT released. The relay SR4 releases and prepares circuits to the relay SW and the relay C1S. If the OS1 relay is operated at the time the storage switch 400 releases, or if the OS1 relay is operated after the storage switch 400 is released, ground on the lead L513 thru armatures FD15 and OS12 energizes the relay OSA which at armatures OSA3 extends ground to the armature OS13 to operate the OS2 relay. The OS2 relay opens the holding circuit to the OS1 relay at armature OS22. The OS1 relay restores and opens the circuit to the OSA relay at armature OS12.

It may be noted that the operator positions such as operator position 910 can extend calls from the central office 100 to the toll switchboard 201 over toll lines such as the toll line 251, by way of the call switches, such as the call switch 940, and the toll line circuits, such as the toll line circuit 250. Assume that the finder switch 900 has connected to an incoming call which is to be extended to the toll switchboard 201. The operator at operator position 910 operates the necessary control apparatus to cause the call switch 940 to step its wipers to the bank contacts associated with the toll line circuit 250, and, if the toll line 250 is not busy, battery thru the winding of relay R360, armatures 353 and 324, over conductor C373 causes the call switch 940 to switch thru to the toll line circuit 250. Ground from the call switch 940 over the conductor C373 operates the relay R360 which at armature 365 opens the incomplete circuit to the relay A10 over lead A102. Absence of battery on the conductor C257 makes the toll line circuit 250 inaccessible to other finder switches, such as the finder switch 900, and ground on the conductor C373 makes the toll line circuit 250 busy to other call switches, such as the call switch 940.

The switchboard 201 is signalled and the connection is completed as explained in detail in the specification of the Imre Molnar Patent 2,361,313, issued Oct. 24, 1944.

If the toll line circuit 250 is busy when called by the operator position 910 by means of the call switch 940, ground on the conductor C373 causes the call switch 940 to step its wipers to the next toll line in the group. If an idle toll line circuit is available, the call switch 940 will switch thrue from battery on the control conductor, similar to the conductor C373, and the connection can be completed. If an idle toll line circuit is not available, the call switch 940 will return a busy signal to the operator at operator position 910. The Imre Molnar Patent 2,361,313, may be referred to for a detailed description of the foregoing operations.

An alarm type fuse FE is provided for the storage switch 400 and a similar fuse is provided for each of the other storage switches. When the fuse FE blows, battery is disconnected from the relays and magnets of storage switch 400 and is connected thru terminal FE1 to the winding of the relay FS. The relay FS, at armature FS1, opens a multiple circuit to the relay FB1 so that the relay FB1 will release if all of the other storage switches become busy, at armature FS2 connects ground to the lead L512 to provide for the operation of the relay FDA and the release of the relay FD1, at armature FS3 connects ground to the lead L513 to provide for the operation of the relay OSA and the release of the relay OS1 should the latter be operated, and at armature FS4 energizes the relay FA which is connected to direct battery at the fuse FE. The relay FA operates and at armature FA1 connects battery to the lamp FA2. The lamp FA2, connected to ground over the lead FA3, lights to indicate the power failure on the storage switch 400.

The storage release key SRK when operated releases any operated storage switch, such as storage switch 400 and permits finder switches, such as the finder switch 900, to connect to the line circuits, such as the line circuit 250, without the co-operation of the storage switches. The operation of the key SRK energizes the relay SR1 from ground at spring SRK1. The relay SR1 operates and at armature SR11 opens the circuit to the relay SR2 which restores and at armature SR24 connects ground to the lead L601. Assume that the storage switch 400 is connected to a marking control circuit, such as marking control circuit A, and that the relays SW and SX are operated. A circuit may be traced from ground on the lead L601 thru armature SW3, spring CAM11 and the lower winding of the relay SR4 to battery. The relay SR4 operates and opens the circuit to the relay SW at armature SR42. The relay SW restores and opens the circuit to the upper winding of the relay SX at armatures SW6 and SW7. The relay SX restores and closes the circuit to the release magnet RLS at armature SX6. The release magnet RLS operates and the storage switch 400 restores to normal as previously described. The lead L601 is multipled to all of the storage switches in the group. Other operated storage switches will be released in the same manner as the storage switch 400.

The relay SR2 opens the circuit to the relay NS at armature SR22, disconnects the relay C1S from the lead L602 at armature SR23 and disconnects the DST lead from the armature C1S1 at armature SR21 to prevent the operation of the relays OA1 and PA1. The relay NS releases, disconnecting the relay ST1 from the storage start resistors at armature NS2 to prevent further operation of the storage control circuit 600, and opening a circuit to the relay PA2 at armature NS1. The relay C1S, if operated, restores when its circuit is opened at armature SR23, opens a circuit to the relay PA2 at armature C1S2, and prepares a circuit to the lead L611 at armature C1S3. The relay PA2 restores, connecting ground to the lead L611 at armature PA21.

The lead L611 is common to all of the marking control circuits, such as marking control circuit A, associated with the storage control circuit 600. Should a call be received now on the toll line circuit 250, the relay A10 will be operated from ground at armature 356 as previously described. The relay A10 at armature A13 closes a circuit to the lower winding of the relay A20 from ground on the lead L611. The relay A20 operates, connecting battery thru the winding of the relay R360, armature 355 and A21 over conductor C257 to the banks of finder switches, such as the finder switch 900, and connecting ground to the common start circuit 930 over conductor C2536 thru armatures A22 and A11, thus making the toll line 250 accessible to the finder switches, such as finder switch 900. The other marking control circuits associated with the storage control circuit 400 will operate in the same manner to make the toll lines to which they are connected accessible to the finder switches.

When the key SRK is restored, the circuit to the relay SR1 is opened at spring SRK1. The relay SR1 restores, prepares a circuit for the OA1 and PA1 relays at armature SR21, closes a circuit for the relay NS at armature SR22, prepares a circuit for the relay C1S at armature SR23, and disconnects ground from the lead L601 at armature SR24. The relay NS operates and closes a circuit to the relay PA2 at armature at NS1. The relay PA2 operates, connects the relay ST1 thru armatures PA23 and NS2 to the storage start resistors, and at armature PA22 connects the relay C1S over lead L602 to the storage switches. The storage switches are now operative in response to incoming calls on the toll line circuits as previously described.

The no storage key NSK is provided to prevent the storage of additional calls while permitting all stored calls to be answered under control of the storage apparatus. It may be noted that all stored calls will be answered before any subsequent calls become accessible to the operator positions and that all calls received during the interval between the operation of the key NSK and the answering of the last stored call become accessible to the operator positions simultaneously.

The operation of the key NSK opens the circuit to the relay NS at spring NSK1. The relay NS restores, disconnects the relay ST1 from the storage start resistors at armature NS2 to prevent further operation of the storage control circuit 600 and of the storage switches in response to incoming calls on the toll lines, and opens a circuit to the relay PA2 at armature NS1. If any of the storage switches are operated, the relay C1S is energized from ground on the lead L602 and the relay PA2 is energized thru armature C1S2. The relay OA1 is connected thru armatures C1S1 and SR21 to the lead DST. The storage control circuit 600 and the storage distributor 500 function as previously explained to release one of the stored calls each time an operator position answers a call. When the last storage switch releases, ground is disconnected from the lead L602 releasing the relay C1S. The relay C1S restores, opening the circuit to the relay PA2 at armature C1S2. The relay PA2 restores and connects ground thru armatures PA21 and C1S3 to the lead L611.

If incoming calls have been received on any of the toll line circuits, the relays corresponding to the relay A10 in the marking control circuits connected to the operated toll line circuits will be operated from ground at armatures such as armature 356. The relays corresponding to the relay A20 in the marking control circuits will be operated after the release of the relay PA2 from ground on the lead L611 thru armatures corresponding to armature A13. The seizure relays of the operated toll line circuits are connected to the banks of finder switches, such as finder switch 900, thru armatures, such as armature A21, and C conductors, such as conductor C257. Ground is connected to the common start circuit 930 thru armatures such as A11 and A22 over conductors such as C2536. The toll line circuits on which incoming calls have been received thus become accessible to the operator positions. Subsequent incoming calls on the toll line circuit will become accessible to the operator positions in the same manner.

When the key NSK is restored, the relay NS is operated from ground at spring NSK1. The relay NS operates the relay PA2 from ground at key SCK through armature NS1. The relay PA2 connects the relay ST1 to the storage start resistors at armature PA23, and connects the relay C1S to the storage switches over the lead L602 at armature PA22. Subsequent incoming calls on the toll line circuits will become accessible to the operator positions under control of the storage apparatus as previously described.

The storage control key SCK is provided to make incoming calls on the toll line circuits directly accessible to the operator positions if no calls are in storage and operator positions are available to answer the calls, and to make the storage apparatus effective if calls are received when operator positions are not available to answer them.

The operation of the key SCK disconnects a ground from the winding of the relay PA2. If any calls are in storage, the relay C1S is operated from ground on the lead L602. The relay PA1 is open at armature C1S1 and is at normal. The relay PA2 is held from ground at armature PA11. Incoming calls on the toll line circuits will be made accessible to the operator positions under control of the storage apparatus as previously described. However, if all stored calls be answered, ground is disconnected from the lead L602 and the relay C1S restores, connecting the relay PA1 to the lead DST at armature C1S1. If an operator position is available to answer a call, the lead DST is connected to ground at position distributor circuit 920 and the relay PA1 is operated, opening the circuit to the relay PA2 at armature PA11. The relay PA2 restores, disconnecting the relay ST1 from the storage start resistors at armature PA23, and connecting ground to the lead L611 at armature PA21. If an incoming call is received now on the toll line circuit 250, the relay A10 is operated from ground at armature 356. Ground on lead L611 thru armature A13 operates the relay A20. Battery thru the winding of the relay R360 is connected to the finder switch banks thru armature A21 over conductor C257, and ground is connected to the common start circuit 930 over conductor C2536 thru armatures A11 and A22.

A finder switch such as finder switch 900, under control of an operator position, such as operator position 910, may now connect to the toll line circuit 250, the relay R360 being operated from ground over conductor C257. The relay R360 releases the relay R350 at armature 361, and opens the circuit to the relay A10 at armature 365. The relay A10 restores, disconnecting ground from the lower winding of relay A20 at armature A13, and disconnecting ground from the common start circuit 930 at armature A11. The relay A20 is held by its upper winding from ground on conductor C257 thru armatures A21, 364, 353 and A24.

Incoming calls on other toll lines become accessible to the operator positions in the same manner as long as the relay PA2 remains normal. When there is no operator position available to answer a call, ground is disconnected from lead DST, opening the circuit to the relay PA1. The relay PA1 restores and operates the relay PA2 from ground at armature PA11. The relay PA2 operates, connecting the relay ST1 to the storage start resistors at armature PA23, disconnecting ground from the lead L611 and connecting ground to the lead L612 at armature PA21, and connecting the relay C1S to the storage switches over lead L602 at armature PA22. Incoming calls received on the toll line circuits will now become accessible to the operator positions under control of the storage apparatus as previously described.

It may be noted that after the storage apparatus begins to function, the storage distributor 500 pre-selects an individual storage switch for connection to an incoming call and also makes an individual storage switch accessible to the operator positions. A control circuit is provided for operation with a timer, which is not shown, for operating the storage distributor 500 to select another storage switch if the pre-selected storage switch fails to connect to an incoming call and does not otherwise advance the storage distributor within a pre-determined time. The control circuit and timer will also operate the distributor to make another storage switch accessible to the operator positions in case the storage switch accessible to operator positions is not released within a pre-determined time after the DST lead is grounded.

Assuming now that the relay FD1 is operated and that an incoming call is received on toll line circuit 250, the relay A10 is operated from ground at armature 356 as previously explained. The relay A10 at armature A15 closes a circuit to the relay ST1 which operates and causes the relays ST2 and ST3 to operate as previously explained. The relay ST1, at armature ST11, connects ground to the timer ST lead to operate the timer. The timer may be of any well known type but is preferably of the type used in Imre Molnar Patent No. 2,361,313, issued Oct. 24, 1944. If the timer ST lead is grounded for a pre-determined time, the timer operates to connect ground momentarily to the pulse 1 lead, and if ground is maintained on the timer ST lead for a pre-determined time thereafter, the timer again operates and connects ground momentarily to the pulse 2 lead. The time required for the timer to connect ground to the pulse 1 lead should be greater than the longest hunting time required for normal operation of a storage switch, so that during the normal operation of the storage apparatus neither the pulse 1 nor pulse 2 leads will be grounded.

If the storage switch 400 operates properly, the relay A10 is released, opening the circuit to the relay ST1, and the relay FDA is operated from ground on lead L512, releasing the relay ST2 which in turn releases the relay ST3. If the relay ST2 fails to release, the relay ST3 is held operated and ground is connected to the timer ST lead at armature SR35. After a pre-determined time, ground on the pulse 1 lead energizes the upper winding of the relay P1 thru armatures ST27 and P21. The relay P1 operates, closes its holding circuit from battery thru its lower winding, armature P11, contact P22, armatures ST33 and ST21, to ground, and connects the lower winding of the relay P2 to the pulse 2 lead at armature P12. After another time interval, ground is connected to the pulse 2 lead energizing the lower winding of the relay P2. The relay P2 operates, opening the holding circuit to the P1 relay at contact P22, opening the starting circuit to the P1 relay at armature P21, energizing its upper winding thru armatures P23, ST33 and ST21, to ground, and energizing the upper winding of the relay FAL thru armatures P24, FB13, ST33 and ST21, to ground. The relay P1 restores and opens the starting circuit to the relay P2 at armature P12. The relay FAL operates, closes a holding circuit to its lower winding thru armature FAL2 to ground at the alarm release key ARK, and energizes the relay ALM and the lamp FDR ALM from ground at armature FAL3. The lamp FDR ALM lights to indicate the abnormal condition and the relay ALM operates, and may extend the alarm thru armatures ALM1 and ALM2 over the leads AP and FDR ALM respectively to other points. The relay FAL energizes the upper winding of the relay KO thru armatures FAL1, P24, FB13, ST33 and ST21, to ground, and energizes the lower winding of the relay KO thru armatures KO2, ST36, FDA3, FB12, and FD11 and the winding of the relay FD2, to battery. The windings of the relay KO are connected differentially and it does not operate at this time. The relay FD2 operates, first closing the contacts associated with the armature FD22, thus connecting ground thru the winding of the relay F1, armatures FD33, FD22, FD11, FB12, FDA3, ST36 and KO2 to the lower winding of the relay KO. The magnetic field of the lower winding of the relay KO is now weakened and the relay operates, opening the circuit to its lower winding at armature KO2, opening the circuit to relay ST2 at armature KO1, and closing a holding circuit to the relay FD2 at armature KO3. The relay FB2 operates in full, opening the circuit to the relay FD1 at armature FD23, and preparing the starting circuit to the storage switch 401 at armature FD24.

The relay ST2 restores when its circuit is opened at armature KO1, opens its incomplete holding circuit at armature ST22, opens circuits to the relays ST3, P2 and KO at armature ST21, and opens the incomplete starting circuit to the relay P1 at armature ST27. The relay ST3 restores and disconnects ground from the timer ST lead at armature ST35. The relay P2 restores, opens its incomplete holding circuit at armature P23, and prepares the starting circuit to the relay P1 at armature P21. The relay KO restores, prepares the circuit to its lower winding at armature KO2, and prepares the starting circuit for the relay ST2 at armature KO1.

The relay ST1 is held operated from ground thru the storage start resistor 4 and the timer continues to operate, alternately connecting ground pulses to the pulse 1 lead and the pulse 2 lead at regular intervals. After the relays KO, ST2 and ST3 have released, the relay ST2 is operated from ground thru armatures KO1 and FDA1, contact ST31, and armatures ST13 and VTS1. The relay ST2 closes a circuit to the relay ST3 at armature ST21, connects ground thru armatures ST23, FDA4 and FD24 to the lead L521 to start the storage switch 401, and connects the relay P1 to the pulse 1 lead at armature ST27. If the storage switch 401 connects to the marking control circuit A, the relay A10 will be released, as previously described, and the circuit to the relay ST1 will be opened at armature A15. The relay ST1 restores and disconnects a ground from the timer ST lead at armature ST11. The FDA relay will be operated when the storage switch 401 connects to the marking control circuit A from ground on the lead L522 and will open the circuit to relay ST2. Relay ST2 releases and opens the circuit to relay ST3. The storage distributor 500 operates as previously described. The relay ST3 restores and disconnects ground from the timer ST lead at armature ST35, thus stopping the operation of the timer.

If the storage switch 401 does not connect to the marking control circuit A within the allowed time, the relays P1 and P2 operate as described in the foregoing and the storage distributor 500 will select another storage switch for operation.

Assume now that the storage switch 400 is connected to the marking control circuit A and is accessible to the operator positions. The relays SW and SX in storage switch 400 are operated, the relay OS1 in storage distributor 500 is operated, and the relay FD1 in storage distributor 500 is normal. When an operator position is ready to answer a call, the relay OA1 is operated from ground on the DST lead as previously described. The relay OA1 closes a previously traced circuit from ground at armature OA11 thru the winding of the relay OA2 and the lower winding of the relay AS in series. The relay OA2 connects ground to the timer ST lead at armature OA21 to start the operation of the timer, and connects the upper winding of relay T1 to the pulse 1 lead at armature OA22. The relay AS operates and connects the lower winding of the relay SX thru armatures AS2 and SX3 over the lead L603 to the armature T24. If the storage switch 400 is not released within a pre-determined time, a momentary ground on the P1 lead thru armatures OA22 and T23 energizes the upper winding of the relay T1. The relay T1 closes a holding circuit from battery thru its lower winding thru armature T11, contact T22 and armature OA23, to ground, and, at armature T12, connects the lower winding of the relay T2 to the pulse 2 lead. If, after another time interval, the storage switch 400 has not been released, a momentary ground on the pulse 2 lead energizes the lower winding of the relay T2. The relay T2 operates, closes a holding circuit from battery thru its upper winding thru armatures T21 and OA23, to ground, opens the holding circuit to the relay T1 at contact T22, opens the starting circuit to the relay T1 at armature T23, and energizes the lower winding of the relay SX from ground thru armature T24. The relay T1 restores and disconnects the lower winding of the relay T2 from the pulse 2 lead at armature T12.

The windings of the SX relay are connected differentially and it releases when its lower winding is energized. The relay SX opens the circuit to its upper widing at armatures SX1 and SX2, opens the circuit to its lower winding at armature SX3, and, at armature SX6, opens the circuit to the relay SW and closes the circuit to the release magnet RLS. The relay SW restores and the release magnet RLS operates allowing the storage switch 400 to restore to normal. Ground thru spring VON11 and armature SW10 is connected to the lead L513 and thru armatures FD15 and OS12 to the winding of the relay OSA. The series circuit to the relays OA2 and AS is opened at armature SW9 when the relay SW restores. The relay OA2 restores, disconnects ground from the timer ST lead at armature OA21, opens the incomplete starting circuit to the relay T1 at armature OA22, and opens the holding circuit to the relay T2 at armature OA23. The relay T2 restores, prepares the starting circuit to the relay T1 at armature T23, and disconnects ground from the lead L603 at armature T24. The relay OSA operates, connecting ground thru armatures OSA3 and OS13 to the winding of the relay OS2. The relay OS2 operates, opening the holding circuit to the relay OS1 which restores and opens the circuit to the relay OSA at armature OS12. A circuit is also prepared thru armatures OS13 and OS23 to the next OS relay in the distributor. The relay OSA restores, and if the storage switch 401 is connected to a marking control circuit, the call stored therein becomes accessible to the operator positions as previously described.

At the time the relay AS operates in series with the relay OA2, ground thru armatures AS3, SX4 and SW4, wiper W13 contact B13, armature A12 and the upper winding of the relay A20, to battery operates the relay A20, which closes its holding circuit at armature A24, and opens the circuit to the lower winding of the relay A10 at armature A23. The relay A10 operates and ground is connected to the common start circuit 930 thru armatures A11 and A22 over conductor C2536. The toll line circuit 250 becomes accessible to the operator positions without the co-operation of the storage apparatus.

As previously described, the relay FAL, operated after the P2 relay operates, closes a holding circuit to itself thru armature FAL2 and the alarm release key ARK. The relay FAL lights the lamp FDR ALM indicating that one of the storage switches has failed to connect itself to an incoming call within the normal time. The relay FAL remains operated until the key ARK is operated. The operation of the key ARK releases the relay FAL, if the relay P2 is not operated, and the relay FAL in releasing extinguishes the lamp FDR ALM.

The routine test key RTK provides a means for testing the storage apparatus. This test should be started when all the storage switches are at normal. It is therefore necessary to operate the key NSK to release the relay NS and to allow the relay PA2 to release when the last operated storage switch releases. As each storage switch releases, the corresponding OS relay in the storage distributor 500 is released and the succeeding OS relay is operated. Finally, the OS relay associated with the storage switch, pre-selected by the storage distributor 500 to hunt for an incoming call, is operated. The FD relay associated with the storage switch is operated and further operation of the OS relays is prevented.

Assume that the relays FD1 and OS1 are operated and the storage switch 400 is in normal position. Ground is connected to the lead L513 thru spring VON11 and armature SW10. The circuit to the relay OSA is opened at armature FD15 and the relay OSA cannot operate to close the starting circuit to the relay OS2 thru armature OSA3.

The operation of the key RTK closes a circuit from ground thru armatures OSA4, PA24 and NS4, spring RTK1, armature TS22 and the lower winding of the relay TS1 to battery. The relay TS1 operates, closes a circuit from ground at armature TS11 over the lead L617 to vertical bank contact 9, and thru storage start resistor 9 thru armatures TS12 and FB21, to the relay ST1; connects battery thru armature TS13 over the lead L616 to the contact B24, and opens the incomplete starting circuit to the relay TS2 at armature TS14. The relay ST1 operates and the storage control circuit 600 functions as previously described to start the hunting operation of the storage switch 400. The relay FT, at the time, is operated from ground thru armatures ST23, FDA4 and FD13 over the lead L511.

The storage switch 400 steps its wipers to the ninth level where ground on vertical bank contact 9 thru wiper W15 controls the transfer of the impulsing circuit from the magnet VERT to the magnet ROT. The storage switch 400 steps its wipers over the bank contacts of the ninth level and when the wiper W14 is stepped onto bank contact B24 battery, thru armature TS13, controls the stopping of the hunting operation of the storage switch 400 and the operation of the relay SW. A circuit may now be traced from ground at the lower winding of the relay TS1 over the lead L614 thru bank contact B22, wiper W12, armature SW6 and FT3, and the upper winding of the relay SX, to battery. The relay SX operates and at armature SX2 connects the wiper W11 to the wiper W12 extending ground thru bank contact B21 over lead L613 to the upper winding of the relay TS1. The windings of the TS1 relay are connected differentially and it therefore releases, preparing a circuit to the relay TS2 at armature TS14, opening the circuit to the relay ST1 at armature TS12, disconnecting battery from the bank contact B24 at armature TS13, and disconnecting ground from the vertical bank contact 9 and the storage start resistors 9 at armature TS11.

The operation of the relay SW controls the operation of the relays FDA and FD2 and the release of the relays FD1 and FT as previously described. A circuit may now be traced from ground thru armatures SW5 and SR41, lead L602, armatures SR23, PA22, spring RTK2, the winding of the relay OA2, armatures OSA1 and OS14, lead L514, armatures FT8 and SW9, and the lower winding of the relay AS, to battery. The relay AS operates, closing a circuit to the relay TS2 from ground thru armatures AS3, SX4 and SW4, wiper W13, bank contact B23, lead L615, armature TS14 and the winding of the relay TS2, to battery. The relay TS2 operates, closing its holding circuit at armature TS21 thru spring RTK1, armature NS4, PA24 and OSA4, to ground, and opening the circuits to both windings of the relay TS1 and to the upper winding of the relay S2 at armature TS22. The relay SX restores and at armature SX6, opens the holding circuit to the relay SW and closes the circuit to the release magnet RLS causing the storage switch 400 to restore as previously described.

Ground thru spring VON11, armature SW10, lead L513, armatures FD15 and OS12 thru the winding of the relay OSA, to battery operates the relay OSA. The relay OSA, at armature OSA4 opens the circuit to the relay TS2, and at armature OSA3 closes a circuit to the relay OS2. The relay OS2 operates, opening the circuit to the relay OS1 at armature OS22, and the relay OS1 restores, opening the ciriuit to the relay OSA at armature OS12. The relay TS2 restores, opening its holding circuit at armature TS21, and preparing the circuit to the lower winding of the relay TS1 at armature TS22. The relay OSA restores, closing the circuit to the lower winding of the relay TS1 at armature OSA4.

The bank contacts B21, B22, B23 and B24, and the vertical bank contact 9 are multiplied to similar contacts in each of the storage switches. The relay TS1 operates, closing a circuit to the ST1 relay and the storage switch 401 operates, switches thru, and releases in the same manner as described above for the storage switch 400. As long as the key RTK remains operated, the storage apparatus continues to operate, each storage switch operating and releasing in turn.

It may be noted that while the routine test is being performed, the timer ST lead is grounded by the relays ST1 and ST3 and by relay OA2 in the normal manner. If one of the storage switches fails to operate or release properly, the timer causes the storage distributor circuit 500 to operate and select another storage switch as previously described.

The relay CIS, which is operated over the lead L602 as long as any storage switch is connected to a marking control circuit, at armature CIS4, closes the circuit to the call storage lamp to give a visual indication that one or more calls are in storage.

Having described my invention, what is considered to be new and desired to be protected by Letters Patent will be set forth in the following claims.

What is claimed is:

1. In a telephone system, a group of finder switches, a plurality of operator positions, a relay, means for operating said relay, means operated in response to the operation of said relay to control the starting and stopping of any one of said finder switches, means operated in response to the stopping of said one finder switch to release said relay, control means for reoperating said relay under control of any one of said operator positions, and means operated in response to the reoperation of said relay for controlling the release of said one finder switch.

2. In a telephone system, a group of finder switches, a plurality of operator positions, a relay, means for operating said relay, means operated in response to the operation of said relay to control the connection of one of said finder switches to said relay, means operated in response to said connection to release said relay, control means for reoperating said relay under control of any one of said operator positions, and means operated in response to the reoperation of said relay for controlling the release of said one finder switch.

3. In a call distributing system, a relay, means for operating said relay, a finder switch, means operated responsive to the operation of said relay for controlling the connection of said finder switch to said relay, means effective responsive to the connection of said finder switch to said relay for releasing said relay to disable said last mentioned controlling means, and means for holding said finder switch in connection with said relay.

4. In a telephone system, a group of finder switches, a plurality of operator positions, a relay, means for operating said relay, means operated in response to the operation of said relay to control the operation of any one of said finder switches, means for releasing said relay, control means for further operating said one finder switch after said relay is released, and means selected by any one of said operator positions and operated under control thereof for operating said control means.

5. In a telephone system, a line circuit, a relay, a group of storage switches, a plurality of operator positions, said relay operated under control of said line circuit to control the operation of one of said storage switches, said relay released under control of said line circuit and said one storage switch, means for further operating said storage switch under control of any one of said operator positions, and said relay again operable by said further operation of said one storage switch to control the connection of said one operator position to said line circuit.

6. In a telephone system, a line circuit, a relay associated with said line circuit, a plurality of operator positions, a plurality of storage switches for storing calls received on said line circuit to said position, means for operating said relay in response to a call on said line circuit, means operated in response to the operation of said relay to control the operation of one of said storage switches, means for releasing said relay in response to the operation of said one storage switch to store said call, means controlled from anyone of said operator positions further operating said one storage switch under control of any one of said operator positions, means responsive to the further operation of said one storage switch for reoperating said relay, means, including said storage switch control means, responsive to the reoperation of said relay for connecting said operator position to said line circuit, to answer said stored call and means for releasing said relay and said storage switch in response to said connection to release said call from storage.

7. In a telephone system, a group of finder switches for storing calls therein, a plurality of operator positions to which said switch are available, a line circuit, over which calls are received a relay associated with said line circuit and operative in response to a call thereon to control the connection of one of said finder switches to said relay, means for releasing, said relay in response to said connection to store said call in said one finder switch, means including said one finder switch for disabling said release means to reoperate said relay means controlled from any one of said operator positions for operating said last mentioned means, means operated responsive to the reoperation of said relay for controlling the connection of said one operator position to said line circuit to answer said stored call, and means operated responsive to the connection of an operator position to said line circuit for releasing said relay and said one finder switch to make said switch available to store further calls.

8. In a telephone system, a line circuit, a marking control circuit associated with said line circuit, a plurality of operator positions, groups of finder switches each group individual to one of said operator positions, finder switches common to all of said operator positions, said marking control circuit being operative under control of said line circuit to extend a marking to said common finder switches, and said marking control circuit being operative under control of said line circuit and one of said operator positions and any one of said common finder switches to extend a marking to the finder switches of said groups individual to said operator positions.

9. In a telephone system, a line circuit, a marking control circuit comprising two relays, a plurality of operator positions, finder switches individual to each of said operator positions, finder switches common to all of said operator positions, one of said relays being operative under control of said line circuit to extend a marking to said common finder switches and to control the connection of one of said common finder switches to said marking control circuit, means to energize a winding of said one relay to release the same in response to the connection of said one common finder switch thereto, means including any one of said operator positions and said one common finder switch for operating said other relay to extend a marking to the finder switches individual to said operator positions and to deenergize said winding to reoperate said one relay, said two operated relays being effective to control the connection of one of the finder switches individual to one of said operator position to said line circuit, means responsive to the connection of one of said finder switches individual to one of said operator positions to said line circuit for releasing said one relay and said one common finder switch, said other relay being held under control of said last mentioned operator position.

10. In a telephone system, a group of finder switches, a plurality of operator positions, a pair of control relays, means for operating one of said relays to control the connection of one of said finder switches to said relay, means for releasing said one relay in response to said connection, means for holding said one finder switch in connection with said one relay, means including said released one relay for connecting said other relay to said one finder switch, control means for operating said other relay from any one of said operator positions, means operated responsive to the operation of said other relay for again operating said one relay, means operable with said pair of relays operated for controlling the release of said finder switch and said one relay, and means for holding said other relay under control of said one operator position.

11. In a signalling system, a plurality of line circuits, a control circuit for each line circuit, a plurality of finder switches, each of said line circuits accessible to each of said finder switches, a group of storage switches, each of said control circuits accessible to each of said storage switches, means responsive to a call on any one of said line circuits for controlling the connection of one of said storage switches to the control circuit thereof, and means for controlling the connection of any one of said finder switches to any one of said line circuits in response to the connection of one of said storage switches to the control circuit of said last one line circuit.

12. In a telephone system, a plurality of operator positions, a group of finder switches individual to each operator position, a group of finder switches common to all of said operator positions, a plurality of line circuits, means responsive to a call on any one of said line circuits for operating a finder switch of said common group, and means operative under control of any one of said operator positions and including an operated one of said finder switches of the common group for connecting any one of the finder switches individual to said one operator position to said one line circuit.

13. In a telephone system, a switchboard, a plurality of distant switchboards, line circuits connecting said one switchboard to said distant switchboards, a plurality of operator positions in said one switchboard each having a plurality of double ended connecting links, means to extend calls over said line circuits from said one switchboard to said distant switchboards said means including said double ended connecting links, means to extend calls over said line circuits from said distant switchboards to said one switchboard, means responsive to the extension of calls from said distant switchboards to said one switchboard for storing the same in a pre-determined order, operator controlled means for connecting said double ended connecting links and said operator positions to said stored calls in the order in which they are stored, and means for disabling line circuits associated with stored calls for the extension of calls from said one switchboard to said distant switchboards.

14. In a telephone system, a plurality of groups of line circuits, means to extend calls to any one of said line circuits in any one of said groups, means for storing calls extended to said line circuits in a predetermined order, a plurality of operator positions, a plurality of groups of links one group individual to each of said operator positions, means for connecting any one individual link of any one of said groups of links to said individual ones of said line circuits of said one group of circuits in the same order in which calls thereon are stored, and means individual to each of said operator positions, said means operated to control the connection of said individual ones of said line circuits to others of said line circuits in any other of said groups.

15. In a telephone system, a plurality of control circuits, a plurality of storage switches, a distributor for pre-selecting an idle one of said storage switches, means for operating one of said control circuits to control the connection of said pre-selected storage switch thereto, a plurality of operator positions, means in said distributor for pre-selecting a connected one of said storage switches, control means common to said operator positions for operating said storage switches, and means for operating said last mentioned storage switch under control of any one of said operator positions.

16. In a call distributing system, a plurality of circuits, means for storing calls on said circuits, a plurality of operator positions, control means individual to each of said positions, a distributor, one channel in said distributor operated for selecting said circuits to store calls thereon in a certain order, a second channel therein operated under control of any one of said control means at said operator positions for selecting said circuits to release calls from storage in the same order.

17. In a call distributing system, a plurality of circuits, means for storing calls on said circuits, a plurality of operator positions accessible to said circuits, a distributor, two channels in said distributor, means in one of said channels for selecting idle ones of said circuits for storing calls therein in a pre-determined order, means controlled by said circuits for disabling said one channel when calls are stored in all of said circuits, means in the other of said channels controlled from said operator position for selecting said circuits to release calls from storage in the order in which they are stored, said means in said other channel selecting the same idle circuit selected by said one channel in case calls are not stored in any of said circuits.

18. In a communication system, a group of switches for storing calls, a distributor having a storing relay and a releasing relay for each of said switches, means for operating one of said storing relays to select its associated switch for storing a call, means for operating one of said releasing relays to select its associated switch for releasing a call from storage, means including said storing relays for selecting said switches for storing calls in a pre-determined order, and means including said releasing relays for selecting said switches for releasing calls from storage in the same order.

19. In a communication system, a group of switches for storing calls, a distributor comprising a plurality of storing relays and a plurality of releasing relays, means for operating one of said storing relays to select one of said switches for storing a call, means responsive to the storing of a call by said one switch for operating another one of said storing relays to select another one of said switches for storing a call, said one storing relay being released in response to the operation of said other storing relay, means for operating one of said releasing relays to select said one switch for releasing said call from storage, means responsive to the release of said call from storage for releasing said one switch, means responsive to the release of said one switch for operating another one of said releasing relays to select said other switch for releasing a call from storage, and means including said storing relays and said releasing relays for releasing calls from storage in the same order in which they are stored.

20. In a telephone system, a plurality of line circuits, a plurality of storage switches having normal positions, an off normal position in each storage switch for each line circuit, other off normal positions in each of said storage switches, a distributor for selecting one of said storage switches, means for extending calls to said line circuits, means responsive to a call on one of said line circuits for operating said one storage switch to the off normal position corresponding to said one line circuit, means for stopping said one storage switch in said corresponding off normal position and for operating said distributor to select another one of said storage switches, a plurality of operator positions, means including said distributor for controlling the connection of any one of said operator positions to said one line circuit, means operative in response to the connection of one of said operator positions to said one line circuit for controlling the release of said one storage switch to its normal position, means operative in case said one storage switch fails to stop in the off normal position corresponding to any line circuit for operating said one storage switch to one of said other off normal positions, and means operative in said other off normal position for controlling the operation of said distributor to select another of said storage switches and for controlling the release of said one storage switch to its normal position.

21. A plurality of storage switches for storing calls having individual paths of power supply, a distributor for selecting said switches one at a time to store successive calls, a control circuit for said switches, means in said control circuit for controlling the operation of said distributor to select another one of said switches, said means operative either in response to the storing of a call by the selected one of said switches or in case of failure of the individual power supply for the selected one of said storage switches.

22. A plurality of storage switches for storing calls, a fuse for each storage switch, a distributor for selecting successive ones of said storage switches to store successive calls, a control circuit for said storage switches to control the operation of said distributor for selecting another one of said storage switches, said control circuit being operated either responsive to the storing of a call by a selected one of said storage switches or responsive to the blowing of the fuse of a selected one of said storage switches.

23. In a telephone system, a plurality of operator positions, a plurality of storage switches having normal positions, a plurality of off normal positions for each of said storage switches, a distributor for selecting said storage switches one at a time, means for operating a selected storage switch to one of its off normal positions, and for stopping said selected storage switch therein, means operative in case said selected storage switch is stopped in certain of off normal positions for holding the same and for operating said distributor to select another one of said storage switches, means operative in case said selected storage switch is stopped in others of said off normal positions for automatically releasing the same to its normal position and for operating said distributor to select another one of said storage switches, and means for releasing a held one of said storage switches under control of any one of said operator positions.

24. In a telephone system, a group of finder switches for storing calls, a distributor for selecting said switches individually in a pre-determined order, means for starting the operation of a selected one of said switches to store a call, means responsive to the storing of a call by a selected one of said switches for operating said distributor to select another one of said switches, a timer operative for controlling the operation of said distributor to select another one of said switches in case a selected one of said switches fails to store a call within a pre-determined time after said starting means has operated, a plurality of operator positions, means in said distributor for selecting individual switches in which calls are stored in the same order in which said switches are selected for storing calls, means operative under control of any one of said operator positions for releasing a selected one of said switches in which a call is stored, means responsive to the release of said last mentioned switch for operating said distributor to select another switch in which a call is stored, said timer operative for controlling the operation of said distributor to select another switch in which a call is stored in case a selected switch in which a call is stored is not released within a pre-determined time after said operator controlled means is operated.

25. In a telephone system, a plurality of line circuits over which calls are received, a control circuit individual to each of said line circuits, means for operating one of said control circuits in response to a received call on its associated line circuit, a group of storage finders, means for operating said finders, means operated in response to the operation of said control circuit to control the operation of any one of said finders to connect said one finder to said one control circuit to thereby store said call in said storage finder, means for releasing said finders, means operated in response to said connection for controlling the operation of said release means to release said call from said storage finder, and distributing means for operating said last mentioned release means in the same order as said control circuits are operated to release said call from storage in the same order as it was stored in said switch.

26. In a telephone system, a plurality of operator positions, a group of finder switches individual to each of said positions, control means individual to each of said positions for controlling the operation of any one of said group of finder switches, a group of storage switches, means for controlling the operation of any one of said group of storage switches, means operated in response to the operation of said one storage switch for rendering said operators individual control means effective with respect to said one finder switch, means for operating said control means to control the operation of said one finder switch, and means operated in response to the operation of said one finder to control the release of said one storage switch.

27. A telephone system as in claim 26 including a storage control switching device, means operated in response to the operation of said device for disabling said storage switch control means, said operation of said last means also controlling the operation of any one of said finder switches at any one of said operator positions.

28. A telephone system as in claim 26 including a storage prevention switching device, means operated in response to the operation of said device disabling said storage switches, and control means operated to control the release of said storage switches in sequence in case any of said switches remain operated.

29. In a telephone system, a group of finder switches, a group of storage switches for storing calls to said finder switch, means for operating one of said storage switches, control means in said storage switch for controlling the further operation of said switch, means for operating said control means in case a finder is available, means operated in response to the operation of said control means for controlling the operation of any one of said group of finder switches, and means operated in response to the operation of said one finder switch for releasing said storage switch.

30. In a telephone system, a marking control circuit for storing calls thereon, means for operating said circuit in response to a call received thereon, a group of storage switches, control means operated in response to the operation of said circuit for controlling the operation of any one of said group of storage switches, means operated in response to the operation of said one switch for connecting said one switch to said circuit to store a call thereon, means operated in response to said connection for disabling said control means, said last means also operated to prepare control means for reoperating said circuit, a group of finder switches for accepting calls stored in said storage switches, a plurality of idle finders in said group of finders, means including said storage switch for controlling the re-operation of said circuit operated in response to the presence of any one idle finder in said group of finders, means operated in response to the re-operation of said circuit for controlling the operation of said one idle finder to answer the stored call, means operated in response to the operation of said one idle finder for releasing said storage switch, thereby disconnecting said switch from said circuit and releasing the call from storage, and other means also operated in response to the operation of said one finder for transferring the control of said circuit from said means including said storage switch to said one finder switch to make said storage switch available to future calls.

31. In a call storage system, a group of storage switches for storing calls therein, a marking control circuit, means for operating said circuit in response to a call received thereon, a storage control circuit, means operated in response to the operation of said marking control circuit for establishing a connection between both of said circuits, a storage distributor, means therein for controlling the operation of said group of switches, means operated in response to said connection for operating said storage distributor, means operated in response to the operation of said distributor for transferring the control of said switch to said marking control circuit and means operated in response to the controlled operation of said switch for re-operating said distributor to pre-select an idle storage switch for connection thereto, for further storage of calls.

HARVEY W. BALZER.

REFERENCES CITED

The following references are of record in the file of this patent:

UNITED STATES PATENTS

| Number | Name | Date |
|---|---|---|
| 1,254,081 | Stearn | Jan. 22, 1918 |
| 1,588,437 | Bailey | June 15, 1926 |
| 1,594,877 | Currier | Aug. 3, 1926 |
| 1,802,179 | Lomax | Mar. 21, 1931 |
| 1,866,593 | Dahl | July 12, 1932 |
| 2,060,585 | Miller | Nov. 10, 1936 |
| 2,091,116 | Griffins | Aug. 24, 1937 |
| 2,233,282 | Buchanan | Feb. 25, 1941 |
| 2,249,362 | Irvine | July 15, 1941 |
| 2,249,486 | Molnar | July 15, 1941 |
| 2,249,516 | Crocker | July 15, 1941 |
| 2,293,611 | Meeds | Aug. 18, 1942 |